US012649331B2

(12) United States Patent
Iwasawa

(10) Patent No.: US 12,649,331 B2
(45) Date of Patent: Jun. 9, 2026

(54) IMAGE FORMING SYSTEM INCLUDING BOOKLET CREATION APPARATUS

(71) Applicant: CANON KABUSHIKI KAISHA, Tokyo (JP)

(72) Inventor: Yusaku Iwasawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/912,358

(22) Filed: Oct. 10, 2024

(65) Prior Publication Data

US 2025/0135798 A1      May 1, 2025

(30) Foreign Application Priority Data

Oct. 26, 2023    (JP) ................................ 2023-183847

(51) Int. Cl.
| | |
|---|---|
| *G03G 15/20* | (2006.01) |
| *B42C 9/00* | (2006.01) |
| *G03G 15/00* | (2006.01) |
| *G06K 15/00* | (2006.01) |

(52) U.S. Cl.
CPC ....... *B42C 9/0081* (2013.01); *G03G 15/2064* (2013.01); *G03G 15/6541* (2013.01); *G03G 15/6585* (2013.01); *G03G 15/80* (2013.01); *G06K 15/404* (2013.01); *G03G 2215/00835* (2013.01); *G03G 2215/00936* (2013.01)

(58) Field of Classification Search
USPC ............................................................ 399/1
See application file for complete search history.

(56) References Cited

U.S. PATENT DOCUMENTS

| | | | |
|---|---|---|---|
| 2008/0056735 A1* | 3/2008 | Sorita ..................... | B42C 11/02 |
| | | | 412/37 |
| 2020/0201202 A1* | 6/2020 | Miura ................ | G03G 15/0225 |

FOREIGN PATENT DOCUMENTS

| | | | | |
|---|---|---|---|---|
| JP | H03106696 A | 5/1991 | | |
| JP | 2004209859 A | 7/2004 | | |
| JP | 2010260321 A | * 11/2010 | ........ | G03G 15/5087 |
| JP | 2017161598 A | 9/2017 | | |
| JP | 2023051022 A | 4/2023 | | |

* cited by examiner

*Primary Examiner* — Quana Grainger
(74) *Attorney, Agent, or Firm* — Canon U.S.A., Inc., IP Division

(57) ABSTRACT

Disclosed is an image forming system having a first mode in which an image forming unit forms toner images and adhesive layers on sheets, and a booklet creation apparatus creates a booklet using the sheets; and a second mode in which the image forming unit forms only adhesive layers on sheets, and the booklet creation apparatus creates a booklet using the sheets. A predetermined temperature of a fixing unit that is set for heating and pressing of a sheet in the fixing unit is lower in the second mode than in the first mode.

10 Claims, 9 Drawing Sheets

FIG.4
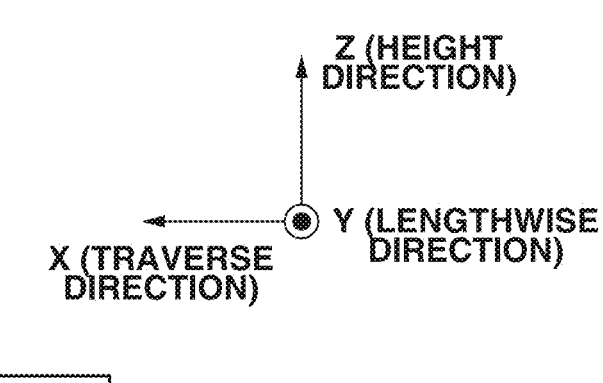
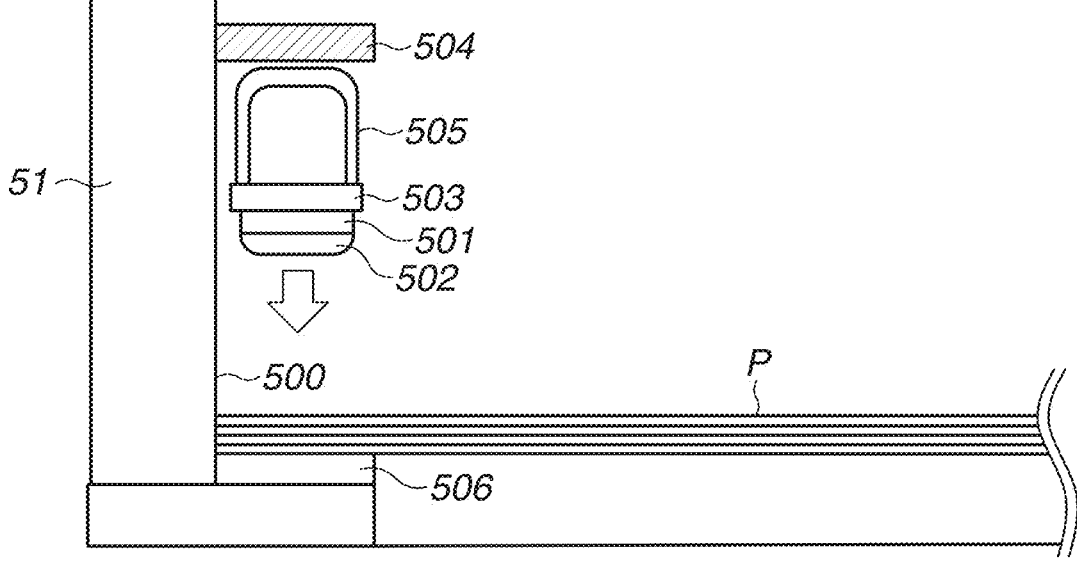

FIG.6C
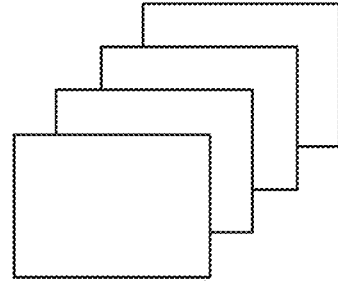
FIG.6B
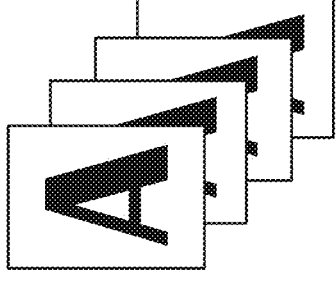
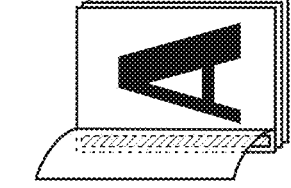
FIG.6A
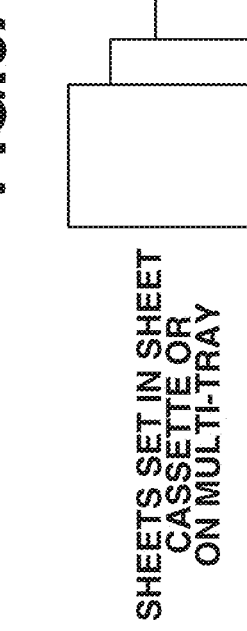
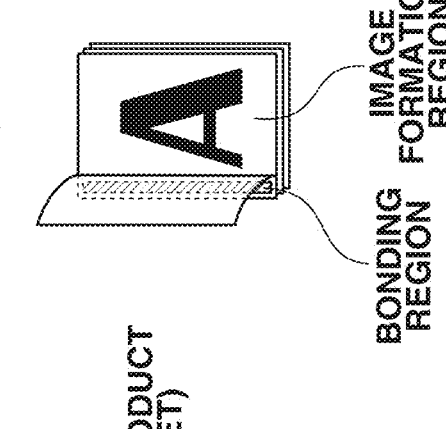
SHEETS SET IN SHEET CASSETTE OR ON MULTI-TRAY
OUTPUT PRODUCT (BOOKLET)
IMAGE FORMATION REGION
BONDING REGION

HEAT
GENERATION
AMOUNT

HEAT
GENERATION
AMOUNT

IMAGE FORMING SYSTEM INCLUDING BOOKLET CREATION APPARATUS

BACKGROUND

Field

The present disclosure relates to an image forming system including an image forming apparatus that can form a toner image and an adhesive layer on a sheet, and a booklet creation apparatus that creates a booklet by bonding a plurality of sheets.

Related Art

Japanese Patent Application Laid-Open No. 2004-209859 discusses an apparatus that bonds sheets by forming an adhesive agent (toner) layer at an end portion of a sheet using an image forming apparatus, fixing the adhesive agent (toner) layer to the sheet by heating and pressing in a fixing unit of the image forming apparatus, and then heating and pressing the adhesive agent layers formed at the sheet end portions of sheets again in a bonding unit of a booklet creation apparatus.

In the above-described configuration, a sheet on which a toner image and an adhesive agent layer have been formed is heated in a heating unit in the fixing unit of the image forming apparatus and a heating unit in the bonding unit of the booklet creation apparatus. Thus, there is a concern that power consumption of the entire system increases.

SUMMARY

The present disclosure overcomes shortcomings of conventional systems, and provides an image forming system with power saving performance improved by reducing power consumption in the image forming system.

According to an aspect of the present disclosure, an image forming system includes an image forming apparatus including: an image forming unit configured to form at least one of a toner image and an adhesive layer on a sheet, and a fixing unit configured to fix the toner image and the adhesive layer to the sheet at a predetermined temperature by heating and pressing while pinching and conveying the sheet; and a booklet creation apparatus configured to create, in a state in which a plurality of sheets to which adhesive layers are fixed are overlaid, a booklet. The booklet is created by heating and pressing the adhesive layers fixed to the plurality of sheets, to bond the plurality of sheets. In a first mode in which the image forming unit forms toner images and adhesive layers on sheets, the booklet creation apparatus creates a booklet using the sheets. In a second mode in which the image forming unit only forms adhesive layers on sheets, the booklet creation apparatus creates a booklet using the sheets. The predetermined temperature is lower in the second mode than in the first mode.

According to another aspect of the present disclosure, an image forming system includes: an image forming apparatus including an image forming unit configured to form at least one of a toner image and an adhesive layer on a sheet; a fixing unit configured to fix the toner image and the adhesive layer to the sheet at a predetermined temperature by heating and pressing while pinching and conveying the sheet, the fixing unit including a rotary member configured to pinch and convey the sheet; a power source configured to apply a voltage with a predetermined polarity to the rotary member in the heating and pressing of the sheet in the fixing unit; and a booklet creation apparatus configured to create, in a state in which a plurality of sheets to which adhesive layers are fixed are overlaid, a booklet. The booklet is created by heating and pressing the adhesive layers fixed to the plurality of sheets, to bond the plurality of sheets. In a first mode in which the image forming unit forms toner images and adhesive layers on sheets, the booklet creation apparatus creates a booklet using the sheets. In a second mode in which the image forming unit only forms adhesive layers on sheets, the booklet creation apparatus creates a booklet using the sheets. A value of the voltage to be applied from the power source to the fixing unit is lower in the second mode than in the first mode.

According to yet another aspect of the present disclosure, an image forming system includes an image forming apparatus including an image forming unit configured to form at least one of a toner image and an adhesive layer on a sheet, and a fixing unit configured to fix the toner image and the adhesive layer to the sheet at a predetermined temperature by heating and pressing while pinching and conveying the sheet; and a booklet creation apparatus configured to create, in a state in which a plurality of sheets to which adhesive layers are fixed are overlaid, a booklet. The booklet is created by heating and pressing the adhesive layers fixed to the plurality of sheets, to bond the plurality of sheets. In a first mode in which the image forming unit forms toner images and adhesive layers on sheets, the booklet creation apparatus creates a booklet using the sheets. In a second mode in which the image forming unit only forms adhesive layers on sheets, the booklet creation apparatus creates a booklet using the sheets. A pressure to be applied to a sheet by the fixing unit is lower in the second mode than in the first mode.

According to yet another aspect of the present disclosure, an image forming system includes an image forming apparatus including an image forming unit configured to form at least one of a toner image and an adhesive layer on a sheet, the image forming unit including an image bearing member that is rotatable and bears at least one of toner and an adhesive agent, a fixing unit configured to fix the toner image and the adhesive layer to the sheet at a predetermined temperature by heating and pressing while pinching and conveying the sheet, and a blade member configured to be in contact with the image bearing member to clean the image bearing member; and a booklet creation apparatus configured to create, in a state in which a plurality of sheets to which adhesive layers are fixed are overlaid, a booklet. The booklet is created by heating and pressing the adhesive layers fixed to the plurality of sheets, to bond the plurality of sheets. In a first mode in which the image forming unit forms toner images and adhesive layers on sheets, the booklet creation apparatus creates a booklet using the sheets. In a second mode in which the image forming unit only forms adhesive layers on sheets, the booklet creation apparatus creates a booklet using the sheets. In the second mode, in a rotation axis direction of the image bearing member, toner is supplied to a contact portion between the image bearing member and the blade member corresponding to a sheet region other than a region of a sheet where the adhesive layer is formed.

Further features of the present disclosure will become apparent from the following description of exemplary embodiments with reference to the attached drawings.

BRIEF DESCRIPTION OF THE DRAWINGS

FIG. 4 is a diagram illustrating a cross-sectional configuration of a thermal compression unit in the booklet creation apparatus according to the first exemplary embodiment.

FIGS. 6A to 6C are diagrams illustrating booklet creation in a second mode according to the first exemplary embodiment.

DESCRIPTION OF THE EMBODIMENTS

1. Image Forming Apparatus
<Apparatus Configuration>

Figure 1:
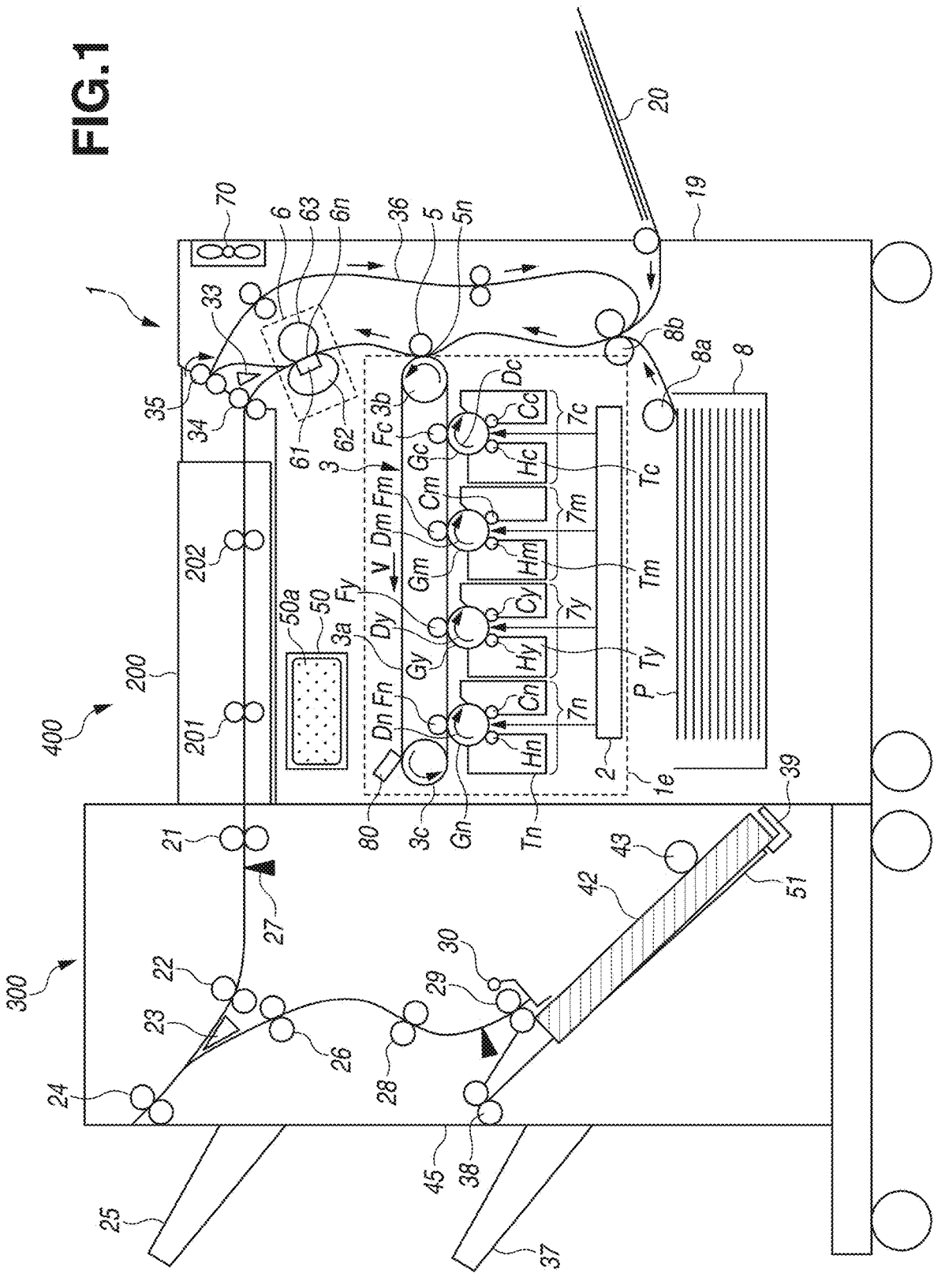
FIG. 1 is a diagram illustrating a cross-sectional configuration of an image forming apparatus and a booklet creation apparatus according to a first exemplary embodiment.

A first exemplary embodiment will be described. The overall configuration of an apparatus will be described with reference to FIG. 1. The present disclosure is not limited to the following exemplary embodiments, and the configuration may be replaced with other configurations without departing from the concepts of the present disclosure. FIG. 1 is a schematic diagram illustrating a cross-sectional configuration of an image forming apparatus 1 and a booklet creation apparatus 300 according to the present exemplary embodiment. As illustrated in FIG. 1, an image forming system 400 is a combination of the image forming apparatus 1 and the booklet creation apparatus 300. The image forming system 400 may include a configuration in which the image forming apparatus 1 has a part or all the booklet creation functions.

The image forming apparatus 1 will be described in detail. As illustrated in FIG. 1, the image forming apparatus 1 includes a sheet cassette 8 serving as a sheet storage unit that store sheets P, an image forming unit 1e serving as an image forming unit, a fixing device 6 serving as a fixing unit, and a housing 19 storing these therein. The image forming apparatus 1 has a print function of forming a toner image on the sheet P fed from the sheet cassette 8 by using the image forming unit 1e, and creating a printed product on which fixing processing has been performed by using the fixing device 6. In the present exemplary embodiment, the maximum size of the sheet P on which an image is formed is an A4 size (vertical 297 mm×horizontal 210 mm), and image formation is performed on an A4-size sheet being conveyed in a lengthwise direction. The sheet cassette 8 is inserted to be drawable from the housing 19 in a lower portion of the image forming apparatus 1 and stores a plurality of sheets P therein. The sheet P stored in the sheet cassette 8 is fed from the sheet cassette 8 by a sheet feeding roller 8a serving as a sheet feeding unit, and conveyed by a conveyance roller pair 8b. Sheets set on a multi-tray 20 can be set one by one.

The image forming unit 1e is a tandem-type electrophotographic unit including four process cartridges 7n, 7y, 7m, and 7c, a scanner unit 2, and a transfer unit 3. The process cartridge refers to a cartridge in which plurality of components performing an image formation process is unitized in an integrally-replaceable manner. The process cartridges 7n, 7y, 7m, and 7c (hereinbelow sometimes collectively referred to as process cartridges 7) have a substantially common configuration except for the types of powder stored in four powder storage units Gn, Gy, Gm, and Gc. That is, the process cartridges 7n, 7y, 7m, and 7c include photosensitive drums Dn, Dy, Dm, and Dc serving as an image bearing member, charging rollers Cn, Cy, Cm, and Cc serving as a charging device, and the powder storage units Gn, Gy, Gm, and Gc that store powder and supply the powder to the photosensitive drums. Among the four powder storage units, in the three powder storage units Gy, Gm, and Gc from the right in FIG. 1, yellow printing toner Ty, magenta printing toner Tm, and cyan printing toner Tc are respectively stored as toner for visible image formation on the sheet P. In the powder storage unit Gn disposed at the leftmost position in FIG. 1, adhesive toner Tn that is a powder to be used for bonding processing after printing is stored. In the present exemplary embodiment, in a case of printing of black images, such as texts, the black images are represented using process black in which the yellow toner Ty, the magenta toner Tm, and the cyan toner Tc are superimposed. Alternatively, for example, the adhesive toner Tn of black color may be used, and a black image may be formed using the adhesive toner. Alternatively, a fifth process cartridge that uses black printing toner may be added to the image forming unit 1e, and black images may be formed using black printing toner. The configuration is not limited to this. The type and the number of printing toners can be changed in accordance with the use application of the image forming apparatus 1. The scanner unit 2 is arranged below the process cartridges 7n, 7y, 7m, and 7c and above the sheet cassette 8. The scanner unit 2 serves as an exposure unit according to the present exemplary embodiment that emits laser light to the photosensitive drums Dn, Dy, Dm, and Dc of the process cartridges 7n, 7y, 7m, and 7c, and writes electrostatic latent images on the photosensitive drums Dn, Dy, Dm, and Dc. The transfer unit 3 includes a transfer belt 3a serving as an intermediate transfer member (secondary image bearing member). The transfer belt 3a is a belt member stretched around a secondary transfer inner roller 3b and a stretching roller 3c, and face the photosensitive drums Dn, Dy, Dm, and Dc of the process cartridges 7n, 7y, 7m, and 7c on the outer circumferential surface. On the inner circumference side of the transfer belt 3a, primary transfer rollers Fn, Fy, Fm, and Fc are arranged at positions corresponding to the respective photosensitive drums Dn, Dy, Dm, and Dc. On each of the photosensitive drums Dn, Dy, Dm, and Dc, a drum cleaning blade serving as a photosensitive drum cleaning unit is disposed in a downstream position of the primary transfer roller. A secondary transfer roller 5 serving as a transfer unit is disposed at a position facing the secondary transfer inner roller 3b. A transfer nip 5n between the secondary transfer roller 5 and the transfer belt 3a is a transfer portion (secondary transfer portion) at which a toner image is transferred onto the sheet P from the transfer belt 3a. On the outside of the transfer belt 3a, a cleaning blade 80 serving as a transfer belt cleaning unit is disposed in a position downstream from the secondary transfer portion.

Figure 2:
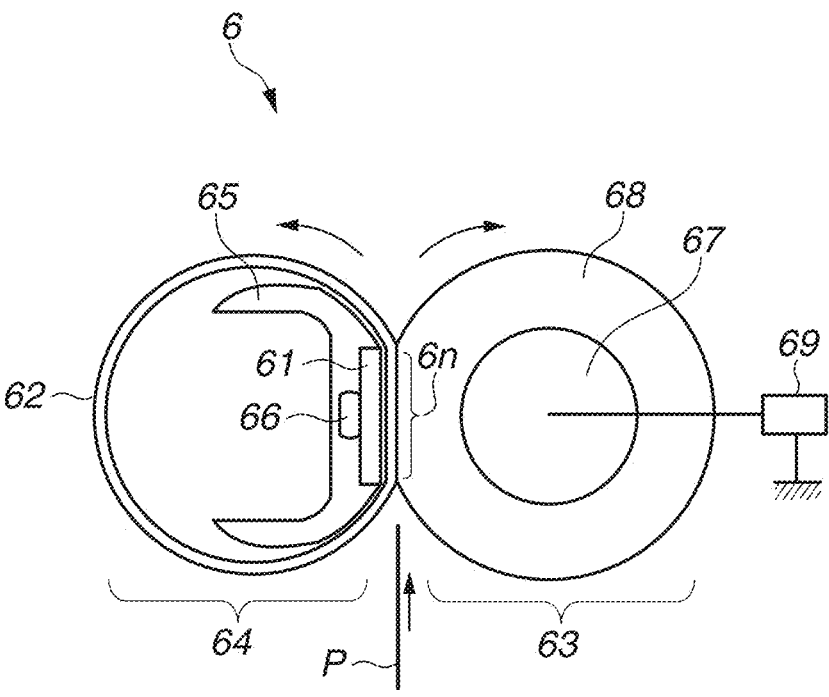
FIG. 2 is a diagram illustrating a cross-sectional configuration of a fixing device according to the first exemplary embodiment.

The fixing device 6 is a fixing unit that fixes toner images on the sheet P by heating and fusing the toner images, and is disposed above the secondary transfer roller 5. The fixing device 6 is a heat fixing type fixing device including a fixing film 62 serving as a fixing member that is heated by a fixing ceramic heater 61 as a heat source, and a pressing roller 63 serving as a pressing member. The fixing device 6 will be described in detail with reference to FIG. 2. FIG. 2 is a cross-sectional view of the fixing device 6, and the fixing device 6 includes a heating member 64 and the pressing roller 63 that are in pressure contact with each other and form a fixing nip 6n. The heating member 64 includes the fixing ceramic heater 61, a film guide 65 that fixes the fixing ceramic heater 61, and the fixing film 62 that is in a cylindrical form and loosely fitted to the exterior of the film guide 65. The fixing film 62 is a film member having low heat capacity and heat resistance. A heat resistant resin, such as polyimide, polyamide, or polyether ether ketone (PEEK) can be used as a base layer, and high thermal conductive powder of carbon, boron nitride, alumina, aluminum, or the like may be mixed to enhance thermal conductivity. An elastic layer made of silicone rubber, fluorine rubber, or the like having heat resistance is provided on the base layer. Furthermore, a superficial layer formed of a heat resistant resin with good releasability, such as a fluorine resin includ-ing polytetrafluoroethylene (PTFE) and perfluoroalkoxy alkane (PFA), is provided as a mold release layer to ensure ability of toner and sheets to separate. The fixing ceramic heater 61 includes a heater substrate, a resistance heating element pattern formed on the heater substrate, and a surface protection layer covering the resistance heating element pattern, is attached to and held on the film guide 65, and is fixedly supported. A high thermal conductive substrate formed of ceramic material, such as alumina or aluminum nitride is used as the heater substrate. The resistance heating element pattern on the heater substrate is formed by screen-printing a resistance heating element including a conductive material, such as sliver/palladium or ruthenium oxide, and a matrix component, such as glass or polyimide. The surface protection layer covering the resistance heating element pattern is made of a glass coating layer to ensure an insulation property and a wear-resistant property with the fixing film.

On the surface of the above-described heater substrate that is opposite to the surface on which the fixing nip 6n is formed, a temperature detection element 66, such as a thermistor, for detection of the temperature of the fixing ceramic heater 61 is disposed in such a manner that the temperature detection element 66 is in pressure contact by predetermined pressing force. To detect a temperature dis-tribution in a width direction of the sheet, a plurality of temperature detection elements 66 may be disposed at the central portion in a sheet width direction or in positions corresponding to a bonding region, for example. By appro-priately controlling a duty ratio of a voltage to be applied to the resistance heating element pattern and/or a wave number in accordance with a signal of the temperature detection element 66, the temperature in the fixing nip 6n is kept approximately constant, and heating to fix toner images on the sheet P is performed. In other words, power supply to the fixing ceramic heater 61 is controlled in such a manner that a temperature detected by the temperature detection element 66 is kept at a desirable predetermined temperature in fixing. The film guide 65 is a guide member that guides rotation of the fixing film 62, and the fixing film 62 is sufficiently loosely fitted to the exterior of the film guide 65. The film guide 65 also serves as a member for holding the fixing ceramic heater 61 and preventing heat release in a direction opposite to the fixing nip 6n, and is formed of a heat resistant resin, such as a liquid crystal polymer, a phenol resin, polyphenylene sulfide (PPS), or PEEK. To reduce sliding resistance between the fixing film 62, the fixing ceramic heater 61, and the film guide 65, heat-resistant sliding grease, such as fluorine grease, is interposed on the inner surface of the fixing film 62.

The pressing roller 63 serving as the pressing member includes an elastic layer 68 formed by a foamed heat-resistant rubber or silicone rubber that is disposed on the outside of a metal core 67 made of metal, such as (steel use stainless) SUS, steel use machinability (SUM), or aluminum (Al), and a mold release layer made of PFA, PTFE, or fluorinated ethylene propylene (FEP) is formed on the elastic layer 68. The pressing roller 63 is sufficiently pressed by a pressing unit including a pressing spring, to form the fixing nip 6n that is used for fixing. In the fixing device according to the present exemplary embodiment, pressing force of the pressing unit is variable by rotational control of a cam disposed at a pressing spring end, and the pressing force is changeable in accordance with a sheet type and a print mode. The metal core 67 of the pressing roller 63 is rotationally driven by a drive unit. By the frictional force generated between the fixing film 62 and the pressing roller (rotary member) 63, the fixing film (rotary member) 62 loosely fitted to the outer periphery of the film guide 65 is driven to rotate. The fixing film 62 and the pressing roller 63 pinch and convey the sheet between the fixing film 62 and the pressing roller 63 while being in pressure contact with each other. Furthermore, in the fixing device according to the present exemplary embodiment, a voltage (fixing bias) with polarity opposite to normal charging polarity of toner is applied from a power source 69 to the metal core 67 of the pressing roller 63. By applying the fixing bias to the pressing roller 63, electrostatic attractive force attracting toward the pressing roller 63 (sheet) acts on toner on the sheet, and an adverse effect on an image, such as offset and scattering of toner, can be prevented. As a heating method of the fixing device other than the above-described method, an induction heating method, a heat roller method, a heating method that employees a halogen lamp as a heat source may be used. As illustrated in FIG. 1, the image forming apparatus 1 accord-ing to the present exemplary embodiment includes a fan 70 that exhausts air in the apparatus to the outside of the apparatus, to suppress a temperature rise in the apparatus that is caused by the fixing device. The fan 70 is operated to exhaust air heated by the fixing device to the outside of the apparatus, and the temperature increase in members in the apparatus and toner in the process cartridge 7 is suppressed.

<Overview of Printing Toner>

In the present exemplary embodiment, general types of printing toner are usable. Among these, printing toner using a thermoplastic resin as a binder resin is desirable. Resins that is usable as the thermoplastic resin are not particularly limited. Resins that are used in general types of printing toner, such as polyester resin, vinyl resin, acrylic resin, and styrene acrylic resin are usable. A plurality of resins of these resins may be contained. Among these, printing toner using styrene acrylic resin is more desirable. The printing toner may contain coloring agent, magnetic material, a charging control agent, a wax, and an external additive.

<Overview of Adhesive Toner Tn>

In the present exemplary embodiment, the adhesive toner Tn containing a thermoplastic resin is usable. Resins that are usable as the thermoplastic resin are not particularly limited. Examples include known thermoplastic resins, such as poly-ester resin, vinyl resin, acrylic resin, styrene acrylic resin, polyethylene, polypropylene, polyolefin, ethylene-vinyl acetate copolymerization resin, and ethylene-acrylic acid copolymerization resin. The adhesive toner Tn may contain a plurality of resins of these resins. The adhesive toner Tn desirably further contains wax. As the wax, known waxes including ester waxes being esters of alcohol and acid, and hydrocarbon waxes, such as paraffin waxes are usable. The adhesive toner Tn may contain a coloring agent. As the coloring agent, known coloring agents, such as black coloring agent, yellow coloring agent, magenta coloring agent, and cyan coloring agent are usable. The adhesive toner Tn may contain a magnetic material, a charging control agent, a wax, and an external additive. To form an adhesive toner-based bonding portion on a sheet using an electrophotographic method, a weight average particle size of the adhesive toner is preferably in a range from 5.0 μm to 30 μm, and more preferably in a range from 6.0 μm to 20 μm. Printing toner may be used as the adhesive toner as long as its adhesiveness satisfies a certain condition.

<Overview of Image Formation Operation>

In response to data of an image to be printed and a printing execution command being input to the image forming apparatus 1, a control unit of the image forming apparatus 1 starts a series of operations for conveyance of the sheet P and formation of an image on the sheet P (image formation operation). In the image formation operation, the sheets P are fed from the sheet cassette 8 one by one, and conveyed toward the transfer nip 5n via the conveyance roller pair 8b. Concurrently with the feeding of the sheet P, the process cartridges 7n, 7y, 7m, and 7c are sequentially driven, and the photosensitive drums Dn, Dy, Dm, and Dc are rotationally driven. In this process, the surfaces of the photosensitive drums Dn, Dy, Dm, and Dc are uniformly charged by the charging rollers Cn, Cy, Cm, and Cc. Laser light modulated based on the image data is emitted by the scanner unit 2 onto the photosensitive drums Dn, Dy, Dm, and Dc of the process cartridges 7n, 7y, 7m, and 7c, respectively, and electrostatic latent images are formed on the surfaces of the photosensitive drums Dn, Dy, Dm, and Dc.

The electrostatic latent images on the photosensitive drums Dn, Dy, Dm, and Dc are developed using powders borne by development rollers Hn, Hy, Hm, and Hc in the powder storage units Gn, Gy, Gm, and Gc of the process cartridges 7n, 7y, 7m, and 7c, respectively. An adhesive toner layer developed and formed on the photosensitive drum Dn differs from toner images of printing toner for recording of images, such as graphics and texts, on the sheet P (normal toner images) in that the adhesive toner layer is not intended to transmit visual information. Nevertheless, in the following description, a layer of the adhesive toner Tn developed by an electrophotographic process to apply the adhesive toner Tn to the sheet P in a predetermined application pattern are also referred to as one of toner images.

Driving of the secondary transfer inner roller 3b using a motor rotates the transfer belt 3a in a counterclockwise direction in FIG. 1 (arrow V). The toner images formed in the process cartridges 7n, 7y, 7m, and 7c, respectively, are primarily transferred from the photosensitive drums Dn, Dy, Dm, and Dc to the transfer belt 3a by electric fields formed between the photosensitive drums Dn, Dy, Dm, and Dc and the primary transfer rollers Fn, Fy, Fm, and Fc, respectively. The toner images that have been borne on the transfer belt 3a and reached the transfer nip 5n are secondarily transferred onto the conveyed sheet P by an electric field formed between the secondary transfer roller 5 and the secondary transfer inner roller 3b. Toner remaining on the transfer belt 3a without being transferred to the sheet P in the secondary transfer is removed from the surface of the transfer belt 3a by the cleaning blade 80. After that, the sheet P is conveyed to the fixing device 6 and subjected to heat fixing processing. The toner image on the sheet P is heated and pressed during passage of the sheet P through the fixing nip 6n, the printing toner Ty, the printing toner Tm, the printing toner Tc, and the adhesive toner Tn are fused and then firmly fixed, whereby the image fixed on the sheet P is obtained.

A switching guide 33 is a flap-shaped guide member for switching a conveyance direction in a case where either a simplex print mode or a duplex print mode is selected. In the simplex print mode, an image is formed on one side of the sheet P, and in the duplex print mode, images are formed on both sides of the sheet P. In a case where the simplex print mode is selected, the switching guide 33 conveys the sheet P toward a discharge roller pair 34. In a case where the duplex print mode is selected, the switching guide 33 conveys the sheet P toward a switchback roller pair 35, and the switchback roller pair 35 reverses its rotation direction after discharging the sheet P up to the rear end to convey the sheet P to a duplex conveyance path 36 for duplex printing. The sheet P conveyed to the duplex conveyance path 36 passes through the secondary transfer portion and the fixing unit again, whereby an image is formed on a sheet surface on which no image has been printed. Finally, the switching guide 33 conveys the sheet P to the discharge roller pair 34. The image formation operation of the image forming apparatus 1 has been described above. An operation to be performed after conveyance of the sheet P to the discharge roller pair 34 will be described below as an operation of the booklet creation apparatus 300. An operation panel 50 is disposed on the exterior of the housing 19, and includes a liquid crystal display unit 50a that is user-viewable and touch-operable. On the liquid crystal display unit 50a of the operation panel 50, an operating status of the image forming apparatus 1 and statuses of consumables, such as toner, are displayed by the control unit. The liquid crystal display unit 50a also has a navigation function of guiding the user in performing a specific operation. When the user changes the setting of a print mode or a booklet creation mode, the user touch-operates a setting screen displayed on the operation panel 50 to change the setting.

<Booklet Creation Apparatus and Booklet Creation Operation>

The description of the cross-sectional configuration of the booklet creation apparatus 300 according to the present exemplary embodiment, and the description of a booklet creation operation will be given with reference to FIG. 1. The sheet P bearing images formed by the image forming apparatus 1 reaches the booklet creation apparatus 300 via an intermediate conveyance unit 200 including conveyance roller pairs 201 and 202. The booklet creation apparatus 300 has a floor standing type configuration, and in its lower portion, includes a sheet alignment unit and a thermal compression unit 51 serving as a heating and pressing unit that heats and presses the aligned sheet bundle for a predetermined time period. The sheet P conveyed from the intermediate conveyance unit 200 is delivered to conveyance roller pairs 21 of the booklet creation apparatus 300. Based on a time at which the rear end of the sheet P passes through an inlet sensor 27, a conveyance roller pair 22 accelerates the sheet P at a predetermined timing. In a case where a discharge destination of the sheet P is a discharge upper tray 25, at the timing at which the sheet rear end reaches a position between the conveyance roller pair 22 and a reversing roller 24, the sheet P is decelerated up to a predetermined discharge speed and discharged to the discharge upper tray 25.

In booklet creation processing by the thermal compression unit 51, a discharge destination of the sheet P serves as a discharge lower tray 37. In this case, a backflow prevention valve 23 urged in a clockwise direction in FIG. 1 by a spring once stops the sheet conveyance at a timing at which the sheet rear end passes through the backflow prevention valve 23, and the sheet P is switched back and conveyed to an inner discharge roller 26. The sheet P conveyed from the inner discharge roller 26 is fed to a kick-out roller 29 via an intermediate conveyance roller 28, and conveyed to an intermediate stacking portion 42. A lengthwise alignment reference plate 39 is disposed at the downmost portion of the intermediate stacking portion 42. The sheet end portions in the conveyance direction are brought into contact with the lengthwise alignment reference plate 39, whereby the alignment of the sheet bundle is performed. An alignment method of the sheet P will be described with reference to FIGS. 3A to 3D. Here, a traverse direction of the sheet P is regarded as an X direction, a lengthwise direction is regarded as a Y direction, and a height direction is regarded as a Z direction.

Figure 3:
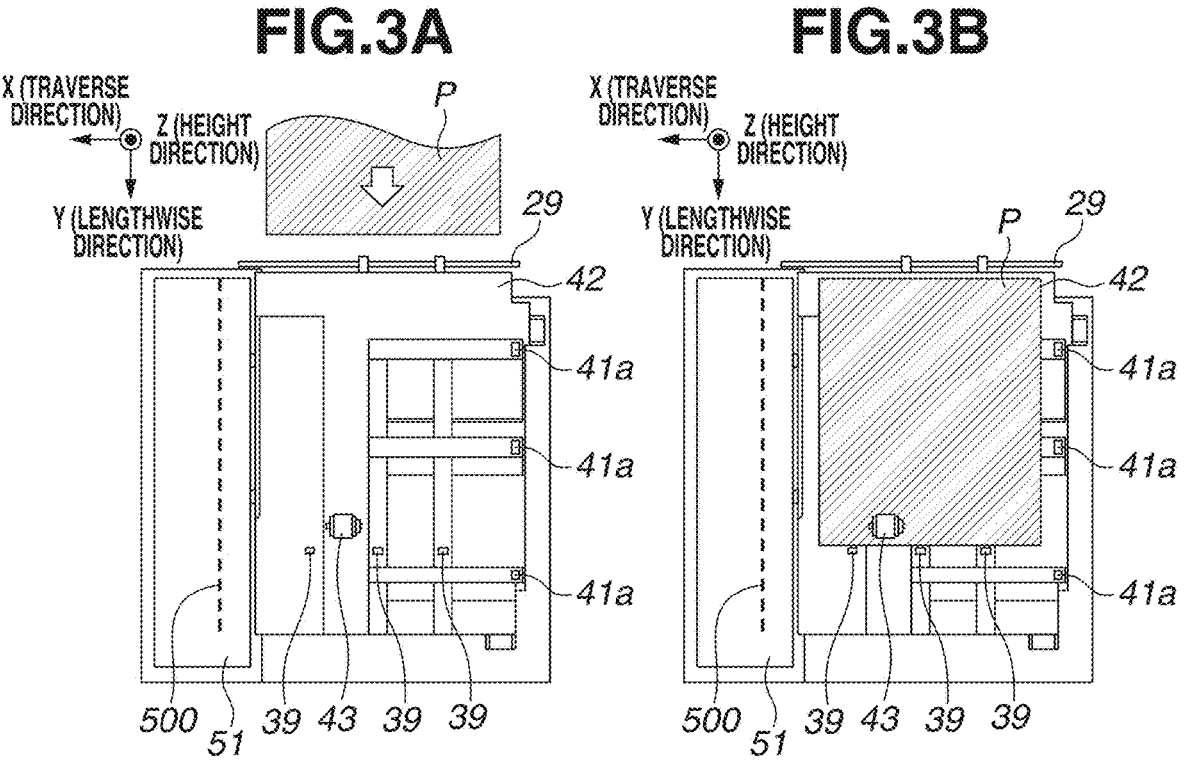
FIGS. 3A to 3D are diagrams illustrating a sheet aligning method in the booklet creation apparatus according to the first exemplary embodiment.

In FIG. 3A, in the intermediate stacking portion 42, a semicircular roller 43 for pushing the sheet P having passed through the kick-out roller 29 into the lengthwise alignment reference plate 39 is rotatably supported. The semicircular roller 43 conveys the sheet P toward the lengthwise alignment reference plate 39 at a predetermined timing. In FIG. 3B, a conveyance pressure of the semicircular roller 43 is adjusted to a pressure by which the semicircular roller 43 slips on the sheet P after the sheet P comes into contact with the lengthwise alignment reference plate 39. To prevent interference between the rear ends of the sheets P stacked in the intermediate stacking portion 42 and the leading end of a following sheet, a bundle hold down flag 30 that prevents the sheet rear end from coming up is rotatably supported in a position downstream from the kick-out roller 29. After the sheet P reaches the lengthwise alignment reference plate 39, in FIG. 3C, an alignment operation is executed until a traverse alignment jogger 41a comes into contact with a traverse alignment reference plate 500 (dotted line). In FIG. 3D, the sheet bundle is aligned at a predetermined position. After the alignment of a predetermined number of sheets ends, heating and pressing processing is performed by the thermal compression unit 51 serving as a sheet bonding unit. The thermal compression unit 51 creates a sheet bundle by performing the heating and pressing processing of a plurality of sheets P. The sheet bundle aligned in the lengthwise direction and the traverse direction is subjected to the heating and pressing processing that is executed by the thermal compression unit 51, whereby a precisely-aligned sheet bundle (booklet) is created.

The structure of the thermal compression unit 51 will be further described with reference to FIG. 4. FIG. 4 is a cross-sectional view of the thermal compression unit 51. In the thermal compression unit 51, an aluminum heating plate 502 having a 1.5-mm thickness is disposed on a ceramic heater 501 having a 1.0-mm thickness and including a heating element as a heat source. The temperature of the ceramic heater 501 is controlled to a constant temperature, which is 240° C., for example, as a target temperature by a temperature detection unit and a power application unit supported on a heater support member 503, ceramic heater 501, whereby the ceramic heater 501 controls a surface temperature of the heating plate 502 to 200° C., for example. The ceramic heater 501 is supported by the heater support member 503 made of resin. A pressure lever 504 obtains drive force from a drive source to apply pressing force to a sheet bundle by pressing the thermal compression unit down in a −Z direction (lower direction). The pressing force from the pressure lever 504 is transmitted via a metal stay 505 serving as a rigid member, to the sheet bundle at an average surface pressure of 0.2 MPa, for example. A pressing range in the bundle of the sheets P is a range of 4.0 mm in the X direction (traverse direction)×300 mm in the Y direction (lengthwise direction). Here, a reception member 506 is a 2.0-mm thickness silicone rubber plate, and is a member for stably receiving the pressing force. The pressing force to be exerted on the sheet bundle is controllable in accordance with a pushing amount of the pressure lever 504. The thermal compression unit 51 heats and presses the sheet bundle, and then gets away from the sheet bundle. In the above-described processing, the adhesive toner Tn applied to the sheet P functions as an adhesive agent by thermal fusion and fixing, and the sheets S are bonded to each other. The booklet creation apparatus 300 according to the present exemplary embodiment employs a configuration of executing the heating and pressing processing every five sheets. Consequently, in creation of a booklet including 15 sheets, for example, the above-described processing is performed every five sheets and performed three times in total.

Figure 5A:
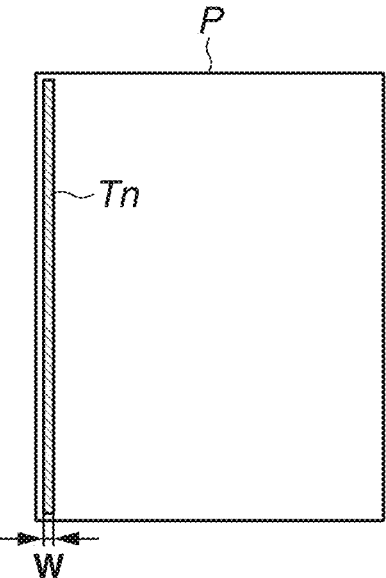
FIGS. 5A to 5C are diagrams illustrating an adhesive toner print region according to the first exemplary embodiment.
Figure 5B:
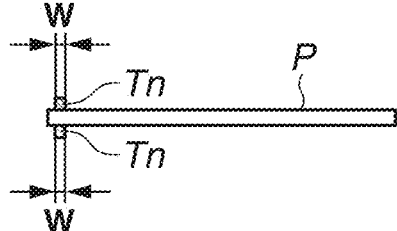
Figure 5C:
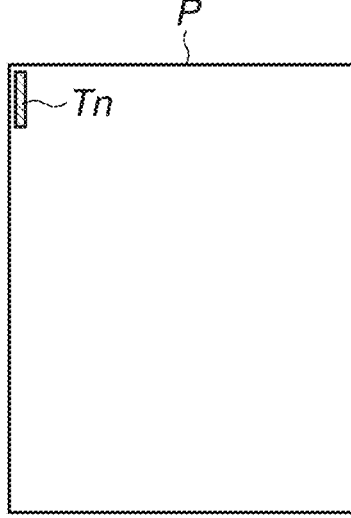

A print region of the adhesive toner Tn according to the present exemplary embodiment will be described with reference to FIGS. 5A to 5C. As illustrated in FIG. 5A, an image is formed in an end portion of a long side of the sheet P using the adhesive toner Tn, whereby a long side bound booklet is created as a deliverable in booklet creation executed by the booklet creation apparatus 300. In the present exemplary embodiment, during the booklet creation, the adhesive toner Tn is applied to the front surfaces and the rear surfaces of the sheets P using the duplex print mode except for a front cover and a back cover. FIG. 5B is a diagram illustrating the sheet P viewed from the direction of sheet sides. As illustrated in FIG. 5B, the adhesive toner Tn is applied to the front surface and the rear surface of the sheet P, and in bonding of a plurality of sheets P, the adhesive toner Tn applied to the front surface of one sheet P is brought into contact with the adhesive toner Tn applied to the rear surface of another sheet. As for the front and back covers, the adhesive toner Tn is applied to the inside surfaces of the booklet. In the present exemplary embodiment, a width W of the print region of the adhesive toner Tn is set to 4.0 mm. As illustrated in FIG. 5C, in a case where an image is formed in a part of a long side end portion using the adhesive toner Tn, a corner-bound booklet is created as a deliverable. In the present exemplary embodiment, a toner amount (bearing amount) per unit area of the adhesive toner Tn is set to 0.50 mg/cm$^2$. In other words, the adhesive toner Tn of 0.50 mg/cm$^2$ is applied to each of the front surface and the rear surface of the sheet P. The measurement of the toner amount is performed in an unfixed state before fixing processing and after secondary transfer.

The description will be continued again with reference to FIG. 1. After completion of binding processing executed by the thermal compression unit 51, a bundle discharge guide pushes the sheet bundle out by moving parallel in a direction toward a sheet discharge port 45 from a standby position. The sheet discharge port 45 is provided with a bundle discharge roller 38. At a position where the sheet bundle leading end passes through the bundle discharge roller 38 a certain little amount, the bundle discharge guide stops and returns again to the standby position. The bundle discharge roller 38 discharges the sheet bundle received from the bundle discharge guide to the discharge lower tray 37.

<Method of Image Formation Operation Suitable for Booklet Creation Mode and Booklet Creation Operation>

Next, a control method of an image formation operation suitable for a booklet creation mode and a booklet creation operation, which is characteristic portion of the present exemplary embodiment, will be described in detail. Two booklet creation modes provided in the booklet creation apparatus 300 according to the present exemplary embodiment will be described. A first mode is a booklet creation mode in which an adhesive layer and a toner image are formed in a bonding region and an image formation region, respectively, in an image formation operation, and then the booklet creation apparatus 300 executes the above-described booklet creation operation. Specifically, as illustrated in FIG. 6A, in the first mode, booklet creation is performed with blank sheets being set in the sheet cassette 8 or on the multi-tray 20 of the image forming apparatus 1, and a booklet in which a desired image is formed in an image formation region on a sheet is created as an output product. In the present exemplary embodiment, a second mode as another booklet creation mode different from the first mode is provided. In the second mode, an adhesive layer is formed in a bonding region and a toner image is not formed in an image formation region in an image formation operation, and then booklet creation operation is executed by the booklet creation apparatus 300. Specifically, as illustrated in FIG. 6B, in the second mode, booklet creation is performed on printed products on which desired images have printed in advance in image formation regions and are set in the sheet cassette 8 or on the multi-tray 20 of the image forming apparatus 1, and a booklet of the set sheets is created as an output product.

As an example of a use case, the second mode is used in an environment where a plurality of image forming apparatuses only having a print function like single-function printers (SFPs) are installed, and only one image forming apparatus including a booklet creation apparatus that is able to perform booklet creation is installed in a large-scale office or the like. In a case where printed products desired to be bound as a booklet, from among printed products output by the plurality of SFPs, are set in the image forming apparatus including the booklet creation apparatus, and bound as a booklet, the second mode is used. As another example of a use case, the second mode is also used in a case where printed products provided from the third party are desired to be bound as a booklet. In other words, the second mode is a mode to be used when printed products output by a different image forming apparatus are bound as a booklet without any changes in images in image formation regions. Alternatively, a booklet of which all pages are blank can also be created. Specifically, as illustrated in FIG. 6C, in a case where booklet creation is performed with blank sheets being set in the sheet cassette 8 or on the multi-tray 20 of the image forming apparatus 1, a booklet of which all pages are blank is created as an output material. Also in this case, the second mode is used. As a use case, the second mode is used when the user creates a notebook, a scribbling pad, or a sketchbook from blank sheets.

The present exemplary embodiment is characterized in that the control of an image formation operation and a booklet creation operation is changed between the first and second modes. In the present exemplary embodiment, the configuration of changing the control of the fixing device 6 of the image forming apparatus 1 between the first and second modes will be described. Specifically, the configuration characterized in that a fixing temperature in the second mode is set to be lower than a fixing temperature in the first mode will be described. In a case where the user creates a booklet, the user is enabled to select a booklet creation mode from the first mode and the second mode in accordance with the above-described use case. In the present exemplary embodiment, by a touch operation performed on a setting screen displayed on the operation panel 50, the user selects a booklet creation mode. A control method of the fixing device 6 that is to be employed in image formation in a case where the first mode is selected as a booklet creation mode will be described. The fixing device 6 controls power supply to the fixing ceramic heater 61 based on a detected temperature detected by the temperature detection element 66 in such a manner as to maintain a desirable temperature during fixing. In the present exemplary embodiment, control is performed in such a manner that a detected temperature detected by the temperature detection element 66 is maintained at a predetermined target temperature (fixing temperature) during passage of the sheet P through the fixing nip 6n.

From the viewpoint of power saving performance, the fixing temperature is desirably set to as low temperature as possible. If a fixing temperature is set excessively low, due to insufficient supplied heat amount, toner and a sheet are insufficiently heated in the fixing nip 6n, and a failure to develop toner adhesion to sheets causes the following fixing failure. Examples of the fixing failure include a blank dot (white spot) on a toner image caused by a part of the toner image being microscopically lost or dropped where the user touches a sheet subjected to fixing, and a decrease in the density of the toner image due to rubbing by the user. Furthermore, an issue that part of toner soils the hand of the user also arises. For this reason, within the range not causing the above-described fixing failure, a fixing temperature of the fixing device 6 is desirably set to as low temperature as possible. In the first mode of the present exemplary embodiment, a fixing temperature of the fixing device 6 is set to 220° C. based on the above-described idea. In other words, the temperature of a toner image in an image formation region of an output booklet is set to as low temperature as possible which does not cause the fixing failure. On the other hand, in a case where the second mode is selected as a booklet creation mode, by setting a fixing temperature of the fixing device 6 to 210° C., which is lower than that in the first mode, a heat generation amount of the fixing device 6 is set to be lower than that in the first mode. The fixing temperature is set in this manner with a view to improving power saving performance.

The reason why the fixing temperature is decreased in the second mode will be described. In the second mode, a toner image is transferred onto the sheet P at the transfer nip 5n only in the bonding region, and a toner image is not transferred in the image formation region. After passage of the sheet P through the fixing device 6, the toner in the bonding region is subjected to the heating and pressing processing in the booklet creation operation by the booklet creation apparatus 300, whereby the toner in the bonding region is changed to a bonding portion of a booklet. In other words, a toner image in the bonding region is not to be directly touched by the user nor viewed by the user. For this reason, even in a case where the above-described fixing failure occurs due to a low fixing temperature, the fixing failure does not affect the quality of a booklet as a final deliverable, and an issue that the hand of the user who picks the booklet up is soiled is avoidable. For the above-described reason, in the present exemplary embodiment, power saving performance is improved by setting a fixing temperature in the second mode to a temperature lower than a fixing temperature in the first mode. Decreasing a fixing temperature in the second mode also leads to improvement in booklet quality in addition to the improvement in power saving performance. As in the use case described with reference to FIG. 6B, in a case where printed sheets on which images have been formed in advance are to be bound as a booklet, the likeliness of an occurrence of a color change in the images of the printed sheets and sheet deformation, such as curl, may increase with an increase in a fixing temperature. It is therefore desirable to set a fixing temperature to a temperature as low as possible to improve booklet quality.

If a fixing temperature is set excessively low, there is a concern that a toner amount in the bonding region excessively decreases due to offset of many toner images in the bonding region. If a toner amount in the bonding region decreases excessively, sufficient adhesiveness is not to be maintained after the heating and pressing processing in the booklet creation operation, and the adhesion strength of the booklet can be deteriorated. It is therefore desirable to lower a fixing temperature in the second mode to the extent that the adhesion strength of the booklet is maintained. The present exemplary embodiment focuses attention on a difference in a heat generation amounts of the fixing device 6 between the first mode and the second mode, and does not change a fixing temperature in accordance with a difference in a toner bearing amount on the sheet. Thus, even in a case where a toner bearing amount in the bonding region and a toner amount in the image formation region are the same by using printing toner as adhesive toner, in the present exemplary embodiment, a fixing temperature in the second mode is able to be lowered as compared with that in the first mode. For example, in the first mode, in a case where a toner bearing amount in the bonding region is 0.50 mg/cm$^2$ and a toner amount in the image formation region is 0.50 mg/cm$^2$, a fixing temperature is set to 220° C. Meanwhile, in the second mode, although a toner bearing amount in the bonding region is 0.50 mg/cm$^2$, a fixing temperature is able to be set to 210° C., which is lower than that in the first mode. In other words, the present exemplary embodiment is characterized in that a fixing temperature is changed in accordance with a booklet creation mode even in a case where toner bearing amounts on the sheets are the same.

after formation of a patch image of 1.5 cm×1.5 cm as a toner image in the image formation region. A toner amount (bearing amount) per unit area of the patch image was 0.50 mg/cm$^2$ similar to the adhesive toner Tn. In the second mode, sheets on which patch images of 1.5 cm×1.5 cm have been printed (fixed) in advance were set in the sheet cassette 8, and a booklet was created without forming a new toner image in the image formation region.

In the performance evaluation test, in the present exemplary embodiment, a booklet was created with a fixing temperature of the fixing device 6 being set to 220° C. in the first mode and to 210° C. in the second mode. As Comparative Examples, examples in which fixing temperatures in the first mode and the second mode were set to the same values were also evaluated. In Comparative Example 1, fixing temperatures in the first mode and the second mode were both set to 220° C., and the evaluation were performed. In Comparative Example 2, fixing temperatures in the first mode and the second mode were both set to 210° C., and the evaluation was performed. In the performance evaluation test, a sheet conveyance speed in the image forming apparatus 1 was set to 320 mm/sec, the number of printed pages per minute was set to 60 ppm, power consumed by the fixing device 6 was measured using a power meter, and average power consumption in booklet creation was measured.

To evaluate fixability, a patch image portion of an output booklet was rubbed five times with lens-cleaning paper (manufactured by Nikon) applied with load of 50 g/cm$^2$, and it was checked whether a white spot was generated in the rubbed patch image. Table 1 shows the evaluation results. Table 1 indicates the power consumption of the fixing device and the occurrence of a fixing failure (white spot) in Comparative Example 1, Comparative Example 2, and the present exemplary embodiment. In a case where a white spot was generated after the patch image portion was rubbed, "V" is indicated, and in a case where no white spot was generated, "not applicable (N/A)" is indicated.

TABLE 1

| | Comparative Example 1 | | Comparative Example 2 | | Present Exemplary Embodiment | |
|---|---|---|---|---|---|---|
| | First Mode | Second Mode | First Mode | Second Mode | First Mode | Second Mode |
| Booklet Creation Mode | | | | | | |
| Fixing Temperature | 220° C. | 220° C. | 210° C. | 210° C. | 220° C. | 210° C. |
| Power Consumption of Fixing Device | 710 W | 710 W | 680 W | 680 W | 710 W | 680 W |
| Occurrence of Fixing Failure | N/A | N/A | ✓ | N/A | N/A | N/A |

Relationship between Power Consumption and Fixability of Fixing Device in Comparative Examples and Present Exemplary Embodiment <Performance Evaluation Test>

Here, a result of a performance evaluation test performed to check the effect of the present exemplary embodiment will be described.

In the performance evaluation test, under the conditions with different fixing temperatures in booklet creation between the first mode and the second mode, power consumption and fixability of the fixing device were measured and compared. As evaluation paper, Red Label Presentation (manufactured by Canon, A4 size) was used, and a booklet including 20 pages was created in each mode of the first mode and the second mode. In the first mode, blank sheets were set in the sheet cassette 8, and a booklet was created In Comparative Example 1, a fixing temperature in the first mode was 220° C., and average power consumption of the fixing device 6 during booklet creation was 710 W. In the fixability check performed by rubbing a patch image portion of an output booklet using the above-described method, a fixing failure such as "white spot" has not occurred. In Comparative Example 1, a fixing temperature in the second mode was also 220° C., and an average power consumption during booklet creation was 710 W, which is the same value as that in the first mode. Also in the second mode, in the fixability check performed by rubbing a patch image portion of an output booklet, a fixing failure such as "white spot" has not occurred.

In Comparative Example 2, a fixing temperature in the first mode was 210° C., and average power consumption of the fixing device 6 during booklet creation was 680 W, which is lower than that in Comparative Example 1. However, in the fixability check performed by rubbing a patch image portion of an output booklet, a "white spot" was generated in a part of a patch image and a fixing failure has occurred. The fixing failure has occurred because the fixing temperature was low and a sufficient amount of heat failed to be supplied to toner and the sheet. On the other hand, in Comparative Example 2, a fixing temperature was 210° C. even in the second mode, and average power consumption during booklet creation was 680 W. In the second mode, since a patch image portion of an output booklet has been fixed in advance of setting of the sheet in the sheet cassette 8, even by rubbing the patch image portion, a fixing failure such as a "white spot" has not occurred. Lastly, a result of the present exemplary embodiment will be described. A fixing temperature in the first mode was 220° C., and average power consumption of the fixing device 6 during booklet creation was 710 W. In the fixability check performed by rubbing a patch image portion of an output booklet using the above-described method, a fixing failure such as "white spot" has not occurred. In the second mode, since a fixing temperature was set to 210° C., which was lower than that in the first mode, average power consumption during booklet creation was reduced to 680 W. Also in the second mode, since a patch image portion of an output booklet has been fixed in advance of setting the sheet in the sheet cassette 8, even by rubbing the patch image portion, a fixing failure such as a "white spot" has not occurred. Furthermore, because of the low fixing temperature, a sheet curl amount was reduced as compared with that in Comparative Example 1. In this manner, by setting a fixing temperature in the second mode to a temperature lower than a fixing temperature in the first mode, power consumption of the fixing device 6 was reduced without causing a fixing failure such as a "white spot". As described above, in the present exemplary embodiment, by setting a fixing temperature in the second mode to a temperature lower than a fixing temperature in the first mode, power saving performance is improved without impairing the quality of a booklet being an output material.

Furthermore, by setting a fixing temperature to a low temperature, because the temperatures of the fixing film 62 and the sliding grease also kept lower, for example, the abrasion wear of the fixing film 62 is suppressed with respect to the number of rotations of the fixing film 62, and thermal degradation of the sliding grease is suppressed, which leads to the extension of the operating life of the fixing device 6. Further, in heating of toner and sliding grease, for example, wax contained in the toner and an oil component contained in the sliding grease vaporize. It is known that ultra fine particles (UFPs) with a grain size of 100 nm or less are accordingly generated by the oil component being recrystallized in air. The generation amount of UFPs tends to increase as the fixing temperature is set to be higher, and lowering a fixing temperature as in the present exemplary embodiment also leads to the reduction in the generation amount of UFPs.

By setting a fixing temperature in the second mode to a temperature lower than a fixing temperature in the first mode as in the present exemplary embodiment, a temperature rise in the image forming apparatus 1 in the second mode is kept gradual. Thus, the air volume of the fan 70 in the second mode may be set weaker than that in the first mode, or an operating time of the fan 70 may be set shorter than that in the first mode. With this configuration, the power consumption of the fan 70 is also able to be saved in the second mode, which further improves power saving performance. When a large number of booklets are consecutively created, to prevent members in the apparatus and toner in the process cartridges 7 from being adversely affected due to high temperature in the apparatus, control may be performed to pause booklet creation during booklet creation and cool the inside of the apparatus (temperature rise suppression control). In a case where such control is performed, in the present exemplary embodiment, a temperature rise in the image forming apparatus 1 in the second mode is more gradual than that in the first mode. For this reason, it is desirable that the frequency at which temperature rise suppression control is executed in the second mode is set to be lower than that in the first mode. This improves the productivity of booklet creation in the second mode, and reduces a time in which temperature rise suppression control is executed (time in which the apparatus is operating for cooling the inside of the apparatus although a booklet is created), whereby power consumption in booklet creation can be saved. In the present exemplary embodiment, the temperature of the sheet having passed through the fixing device 6 in the second mode is lower than that in the first mode. In a case where a sheet moving time from the fixing device 6 to the thermal compression unit 51 is extremely short, and a sheet temperature in bonding executed in the thermal compression unit 51 and adhesion strength of the booklet vary between the first mode and the second mode, a bonding condition of the thermal compression unit 51 may be varied. For example, in the second mode, by setting pressing force of the thermal compression unit 51 stronger than that in the first mode, prolonging a pressing time, or setting the temperature of a heating plate to a higher temperature, it is desirable to prevent adhesion strength of the booklet from getting worse than that in the first mode. From the viewpoint of power saving performance, the above-described change in the bonding condition is desirably performed to the extent that the power consumption of the entire apparatus (image forming apparatus and booklet creation apparatus) in the second mode is lower than that in the first mode.

In the present exemplary embodiment, the configuration of improving power saving performance by changing a fixing temperature of the fixing device 6 has been described. Alternatively, it is also possible to improve the productivity of booklet creation by changing a sheet conveyance speed of the image forming apparatus 1. For example, with the fixing temperature being fixed at 220° C., while a sheet conveyance speed in the first mode is 320 mm/sec, a sheet conveyance speed in the second mode may be set to 370 mm/sec, which is a speed faster than that in the first mode. In a case where the sheet conveyance speed is set to be faster, a time during which the fixing film 62 and the sheet are in contact with each other at the fixing nip 6n is decreased. In other words, a time during which heat is supplied from the fixing film 62 is decreased, which decreases the heat amount supplied to the sheet and toner on the sheet accordingly. This results in occurrence of, as described above, a fixing failure such as a blank dot (white spot) on a toner image caused by a part of the toner image being microscopically lost or dropped where the user touches a sheet subjected to fixing, and a decrease in the density of the toner image due to rubbing by the user.

In the second mode, in the image forming apparatus 1, a toner image that is transferred onto the sheet P at the secondary transfer portion is for the bonding region, and a toner image is not transferred in the image formation region.

After passage of the sheet P through the fixing device 6, the toner in the bonding region is subjected to the heating and pressing processing in the booklet creation operation executed by the booklet creation apparatus 300, whereby the toner in the bonding region serves as a bonding portion of a booklet. In other words, a toner image in the bonding region is not to be directly touched by the user nor viewed by the user. For this reason, even if the above-described fixing failure occurs due to a high conveyance speed, the fixing failure does not affect the quality of a booklet being a final deliverable, and an issue that the hand of the user who picks the booklet up is soiled is avoidable. For the above-described reason, a sheet conveyance speed in the second mode is set to a speed faster than that in the first mode, which shortens booklet creation time, and consequently enhances the productivity of booklet creation. A decrease in power for supplying heat to toner on the sheet is larger than an increase in power for increasing a conveyance speed, which improves power saving performance.

In the present exemplary embodiment, the configuration of not forming a toner image in an image formation region has been described. A digital watermark (background watermark) in which information in booklet creation is buried in an image formation region may be formed as a dot pattern with a low coverage. Forming a background watermark in an image formation region of a booklet allows identifying and tracking of an apparatus that has performed booklet creation, and a booklet creation condition, from the background watermark of the booklet being an output material, which improves security performance. For example, as illustrated in FIG. 6B, in a case where printed sheets output by a different image forming apparatus are to be bound as a booklet under the condition of the same fixing temperature as that in the second mode, information indicating that the condition of the fixing temperature is the same as that in the second mode is embedded in an image formation region as a background watermark in a user-invisible state. With this configuration, identifying that an apparatus that has outputted the printed sheets, and an apparatus that has bonded the printed sheets as the booklet thereafter are different apparatuses from each other is able to be performed, and determining whether images in image formation regions of the booklet are not added nor altered during booklet creation is able to be performed. Employing a dot pattern with a low coverage, as a background watermark leads to avoidance of the above-described fixing failure even under the condition with a low fixing temperature.

In a case where a background watermark in which information regarding a different image forming apparatus is already embedded exists on a printed product output by the different image forming apparatus, the background watermark overlaps with a background watermark in booklet creation, and identification accuracy can decline. In view of the foregoing, a background watermark may be embedded in a toner image in a bonding region. For example, by forming a white filled dot pattern (pattern in which regions where adhesive toner does not exist are regularly provided) in a toner image in the bonding region, identification accuracy may be improved. Alternatively, by forming the printing toner Ty, the printing toner Tm, and the printing toner Tc in a toner image in the bonding region as dot patterns, identification accuracy may be improved. Furthermore, a barcode or a matrix two-dimensional code may be formed in the bonding region.

Varying a pattern of the above-described background watermark for each page of the booklet may also be applicable to embed information that is based on a page number. This configuration, for example, leads to identifying that a part of pages has been extracted or part of pages has been altered after a booklet of a contract document or a confidential document is created, which improves security performance of the booklet. Also, during booklet creation in the first mode, the above-described background watermark may be formed in the bonding region and the image formation region. In this manner, forming a background watermark on the sheet during booklet creation improves security performance of an output booklet.

A second exemplary embodiment will be described. Basic configurations of the image forming apparatus 1 and the booklet creation apparatus 300 are the same as those described in the first exemplary embodiment with reference to FIG. 1. The description on the image forming apparatus 1 described in the first exemplary embodiment is to be cited, and the redundant detailed description will be omitted. In the present exemplary embodiment, a configuration of changing the output of a fixing bias of a fixing device between the first mode and the second mode will be described. As illustrated in FIG. 2, in the fixing device according to the present exemplary embodiment, a voltage (fixing bias) with polarity opposite to normal charging polarity of toner being a predetermined polarity is applied from the power source 69 to a metal core portion of the pressing roller (rotary member) 63. Application of the fixing bias to the pressing roller 63 generates electrostatic attractive force toward the pressing roller 63 (sheet) acting on the toner on the sheet, and this prevents offset and scattering of toner. In the present exemplary embodiment, in the first mode, when the sheet passes through the fixing device 6, a voltage of +1500 V is applied to the pressing roller 63 as a fixing bias. On the other hand, in the second mode, the output of the power source 69 is turned OFF, and a fixing bias is not applied to the pressing roller 63.

In the second mode, since unfixed toner does not exist in the image formation region, offset and scattering of toner do not occur in the image formation region. On the other hand, in unfixed toner in the bonding region, electrostatic attractive force on the sheet decreases as compared with that in the first mode, which easily leads to occurrence of mild offset and scattering. However, the bonding region is a region invisible to the user in a booklet being a final deliverable, and even if mild offset or scattering occurs, the quality of the booklet is not impaired. In this manner, the output of the fixing bias in the second mode is set to an output lower than the output in the first mode which reduces power consumption of the power source 69 and improves power saving performance. In the present exemplary embodiment, the output is completely turned OFF by setting a fixing bias to 0 V, but the fixing bias is not limited to this. The fixing bias may be set to a voltage lower than that in the first mode. For example, the fixing bias may be set to +500 V. The level of offset or scattering varies depending on toner characteristics and physical property values of the fixing film 62 and the pressing roller 63. It is desirable to lower an output in accordance with the configuration of the fixing device 6 without causing extremely poor-level offset or scattering and adversely affecting the adhesion strength of the booklet. A similar effect is obtainable by applying a voltage of the same polarity as the polarity of toner to the fixing film 62 serving as a rotary member.

A third exemplary embodiment will be described. Basic configurations of the image forming apparatus 1 and the booklet creation apparatus 300 are the same as those described in the first exemplary embodiment with reference to FIG. 1. The description on the image forming apparatus 1 described in the first exemplary embodiment is to be cited, and the redundant detailed description will be omitted. In the present exemplary embodiment, a configuration of changing the pressing force of a fixing device 6 between the first mode and the second mode will be described.

In the fixing device 6 according to the present exemplary embodiment, in order to form the fixing nip 6n, the pressing roller 63 is pressed against the fixing ceramic heater 61 via the fixing film 62 by a pressing unit such as a pressing spring. By rotationally controlling a cam disposed at a pressing spring end, the pressing force of the pressing unit is made variable.

An elastic deformation amount of the pressing roller 63 decreases with a decrease in the pressing force of the fixing device 6, and consequently, the fixing nip 6n is narrowed, which leads to a decrease in a time during which the fixing film 62 and the sheet are in contact with each other at the fixing nip 6n. In other words, a time during which heat is to be supplied from the fixing film 62 decreases, which decreases the supplied heat amount of the sheet and toner on the sheet. This results in occurrence of a fixing failure such as a white spot caused by the user touching a sheet subjected to fixing and a decrease in the density of a toner image. On the other hand, if the pressing force of the fixing device 6 is set to high pressing force, sliding resistance at a fixing nip portion is increased, and torque of a motor driving the pressing roller 63 is increased, which leads to a tendency for the power consumption of the motor to increase. It is therefore desirable to set the pressing force of the fixing device 6 to as low pressing force as possible by which the above-described fixing failure does not occur. In the first mode of the present exemplary embodiment, the pressing force of the fixing device 6 is set to 20 kgf, based on the above-described idea. In other words, pressing force on a toner image in an image formation region of an output booklet is set to as low pressing force as possible by which a fixing failure does not occur. On the other hand, in a case where the second mode is selected as a booklet creation mode, the pressing force of the fixing device 6 is set to 15 kgf, which is a value lower than the value in the first mode, and torque of a motor driving the pressing roller 63 is set to lower than that in the first mode. This is to improve power saving performance by reducing the power consumption of the motor.

The reason why the pressing force is decreased in the second mode will be described. In the second mode, in the image forming apparatus 1, a toner image that is transferred onto the sheet P at the secondary transfer portion is for the bonding region, and a toner image is not transferred in the image formation region. After passage of the sheet P through the fixing device 6, the toner in the bonding region is subjected to the heating and pressing processing in the booklet creation operation executed by the booklet creation apparatus 300, whereby the toner in the bonding region serves as a bonding portion of a booklet. In other words, a toner image in the bonding region is not to be directly touched by the user nor viewed by the user. For this reason, even if the above-described fixing failure occurs due to low pressing force, the fixing failure does not affect the quality of a booklet being a final deliverable, and an issue that the hand of the user who picks the booklet up is soiled is avoidable. For the above-described reason, in the present exemplary embodiment, the pressing force of the fixing device 6 in the second mode is set to pressing force lower than the pressing force in the first mode, which reduces the power consumption of a motor driving the pressing roller 63, and consequently, power saving performance is improved.

Furthermore, reducing the pressing force of the fixing device 6 leads to reduction in sliding resistance between the fixing ceramic heater 61 and the fixing film 62, which suppresses the abrasion wear of the inner surface of the fixing film 62 with respect to the number of rotations of the fixing film 62, for example. This also reduces sliding resistance with a bearing portion supporting a rotating shaft of the metal core of the pressing roller 63. In this manner, in the present exemplary embodiment, the pressing force of the fixing device 6 in the second mode is set to pressing force lower than the pressing force in the first mode, which leads to improvement in both power saving performance and the operating life of the fixing device 6.

A fourth exemplary embodiment will be described. Basic configurations of the image forming apparatus 1 and the booklet creation apparatus 300 are the same as those described in the first exemplary embodiment with reference to FIG. 1. The description on the image forming apparatus 1 described in the first exemplary embodiment is to be cited, and the redundant detailed description will be omitted. In the present exemplary embodiment, control of preventing the contamination of a fixing device 6 that can occur when booklet creation in the second mode is repeated many times will be described. In the first to third exemplary embodiments, the configuration for an improvement of power saving performance that is realized by setting a fixing temperature, a fixing bias, or pressing force in the second mode to a value lower than that in the first mode has been described. As described above, toner in the bonding region in the second mode tends to generate a fixing failure, such as a white spot and offset, in comparison with a case in the first mode.

In a case where a booklet creation operation is repeated under the condition where a fixing failure and offset easily occur, part of toner microscopically lost or dropped from a toner image transfers to the surface of the fixing film 62 or the pressing roller 63 and is aggregated, and so-called contamination can occur. The contamination easily occurs especially in a case where the surface of the fixing film 62 or the pressing roller 63 is roughened, or powder paper or loading material adheres to the surface. If the contamination occurs, sheet conveyance performance is adversely affected or fixability further declines. The present exemplary embodiment is characterized in that, in a case where booklet creation in the second mode is consecutively performed exceeding a predetermined number of sheets (first number of sheets), the setting of the fixing device 6 in the second mode is changed to prevent the above-described contamination.

In the present exemplary embodiment, in a case where booklet creation in the second mode is performed on a predetermined number of sheets (=200), a fixing temperature in fixing 20 sheets from the subsequent sheet is set to a temperature higher by 10° C. For example, in a case where a fixing temperature in the second mode is 210° C. as in the first exemplary embodiment, after a predetermined number of sheets (=200) have passed, a fixing temperature in fixing the 201st to 220th sheets is set to 220° C. Setting a fixing temperature to a higher temperature and setting the temperature of toner that has transferred to the fixing film 62 or the pressing roller 63 to higher temperature leads to an increase in adhesion to the sheet, and the toner is shifted to the sheet again, whereby contamination is prevented. Then, after a predetermined number of sheets (second number of sheets) (20 sheets) are further fixed at the fixing temperature of 220° C., the fixing temperature is returned to 210° C., and booklet creation is continued.

In order to effectively heighten the temperature of toner that has transferred to the fixing film 62 or the pressing roller 63, a sheet conveyance interval may be extended. Furthermore, by widening a fixing nip and extending a contact time with the sheet by also increasing pressing force in addition to the fixing temperature, toner that has transferred to the fixing film 62 or the pressing roller 63 may be caused to be more easily transferred to the sheet again. The ease of contamination occurrence and the ease of re-transferring vary depending on toner characteristics, and physical property values of the fixing film 62 and the pressing roller 63. Thus, a predetermined number of sheets based on which a setting change of the fixing device 6 is triggered, the number of sheets based on which the setting of the fixing device 6 is to be changed thereafter, and change amounts of a fixing temperature and pressing force are not limited to the above-described values. It is desirable to set an optimum value in accordance with the configuration of the fixing device 6.

Under a situation where the contamination easily occurs, instead of changing the setting after a predetermined number of sheets as described above, the setting of the fixing device 6 may be changed for several sheets including a final page of booklet creation for each booklet. For example, when a booklet including a bundle of 30 sheets is to be created, for 26th to 30th sheets, a fixing temperature may be increased, a sheet conveyance interval may be extended, or pressing force may be increased as described above. With this configuration, even in a case where slight contamination occurs due to booklet creation in the second mode, occurrence of impairing in the quality of the back cover of the booklet, printed products of the next job, and the front cover of a booklet of the next job are avoidable. For example, in a case where slight contamination occurs in the fixing film 62 or the pressing roller 63 in creation of a booklet in the second mode, there is a concern that the contamination occurs again to the back cover of the booklet (back cover on which no toner image exists in the bonding region), and the quality of the back cover is impaired.

After a booklet is created in the second mode, in a case where a normal print operation of not creating a booklet is performed as the subsequent job, there is a concern that contamination is transferred again onto the sheet of the subsequent job (onto the sheet on which no toner image exists in the bonding region) and the quality of a printed image is impaired. Even in a case where booklet creation is repeated, there is a concern that contamination is transferred again to the front cover of a booklet in the subsequent job (front cover on which no toner image exists in the bonding region), and the quality of the front cover of the booklet is impaired.

In view of the foregoing, in a case where booklet creation in the second mode is performed, contamination adhering to the surface of the fixing film 62 or the pressing roller 63 is transferred again onto a sheet on which the bonding region exists, in advance at the end of a booklet creation operation. With this configuration, the quality of the back cover, printed products of the next job, and the front cover of the booklet of the next job is maintained. The ease of contamination occurrence and the ease of re-transferring vary depending on toner characteristics, and physical property values of the fixing film 62 and the pressing roller 63.

Thus, the number of sheets based on which the setting of the fixing device 6 is to be changed is not limited to the above-described value. It is desirable to set an optimum value in accordance with the configuration of the fixing device 6.

A fifth exemplary embodiment will be described. Basic configurations of the image forming apparatus 1 and the booklet creation apparatus 300 are the same as those described in the first exemplary embodiment with reference to FIG. 1. The description on the image forming apparatus 1 described in the first exemplary embodiment is to be cited, and the redundant detailed description will be omitted. In the present exemplary embodiment, a configuration of changing a heat generation distribution of a fixing device 6 between the first mode and the second mode will be described. FIGS. 7A to 7E are diagrams illustrating a resistance heating element pattern of a fixing ceramic heater 61, a heat generation distribution, and a bonding region on a sheet according to the present exemplary embodiment.

Figure 7A:
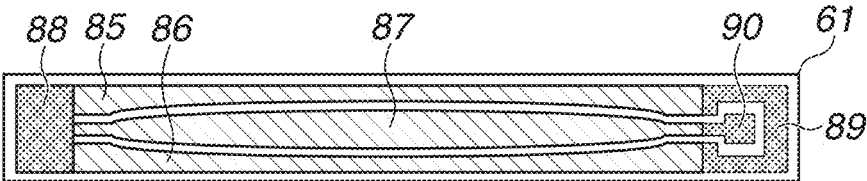
FIGS. 7A to 7E are diagrams illustrating a fixing ceramic heater and a heat generation distribution according to a fifth exemplary embodiment.
Figure 7B:
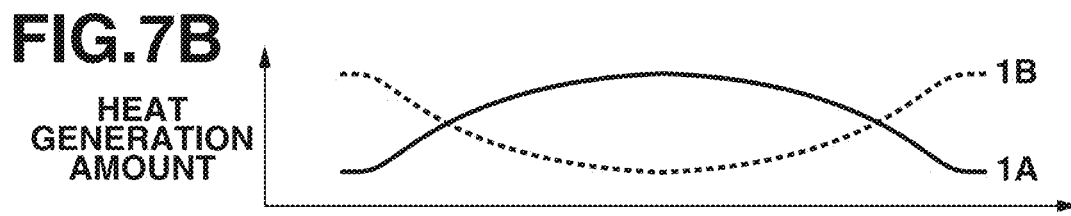

The fixing ceramic heater 61 according to the present exemplary embodiment employs a heater that is able to vary a heat generation distribution in a width direction of the sheet (a direction intersecting with a sheet conveyance direction on a sheet surface). As an example, as illustrated in FIG. 7A, the description will be given of a heater provided with resistance heating elements 85 and 86 with narrowed heating element widths in a sheet conveyance direction at a width direction center part, and a resistance heating element 87 with a narrowed heating element width in the sheet conveyance direction at width direction end portions, as a resistance heating element pattern. With power supplied between power supply electrodes 88 and 89 via a power supply control unit such as a triac, the resistance heating elements 85 and 86 generate heat, and a heat generation distribution with a high heat generation amount at the width direction center part as indicated by a line 1A in FIG. 7B is obtained. On the other hand, with power supplied between power supply electrodes 88 and 90, the resistance heating element 87 generates heat, and a distribution with high heat generation amounts at the width direction end portions as indicated by a line 1B in FIG. 7B is obtained. In the present exemplary embodiment, by controlling power ratios between the power supply electrodes 88 and 89, and between the power supply electrodes 88 and 90, a heat generation distribution in the width direction is set to be variable. The present exemplary embodiment is characterized in that, in the above-described fixing device that is able to vary a heat generation distribution in the width direction, the magnitude of a fixing temperature in an image formation region relative to a fixing temperature in a bonding region in the second mode is set to be lower in the second mode than that in the first mode. For example, in the case of the heater as illustrated in FIG. 7A, in the first mode, the power ratios between the power supply electrodes 88 and 89, and between the power supply electrodes 88 and 90 are set to almost the same level, and control is performed in such a manner that an almost-uniform heat generation distribution is obtained along the sheet width direction. With this configuration, heat is uniformly generated in a bonding region (adhesive layer region) and an image formation region (toner image region), so that unfixed toner in the bonding region and unfixed toner in the image formation region are excellently fixed onto a sheet. On the other hand, in the second mode, a power ratio between the power supply electrodes 88 and 90 is increased as compared with an amount of power supplied between the power supply electrodes 88 and 89, and control is performed in such a manner as to obtain a heat generation distribution in which heat generation amounts at the sheet width direction end portions are set to be higher. In this control, the fixing temperature of a temperature detection element disposed at a position corresponding to a bonding region is controlled to be at the same temperature as that in the first mode, whereby a heat generation amount in the image formation region where no unfixed toner exists is reduced, while unfixed toner in the bonding region onto a sheet is excellently fixed. In other words, a fixing temperature in the second mode is set to be lower than that in the first mode, which reduces a heat generation amount of the fixing device 6 and improves power saving performance.

Figure 7C:
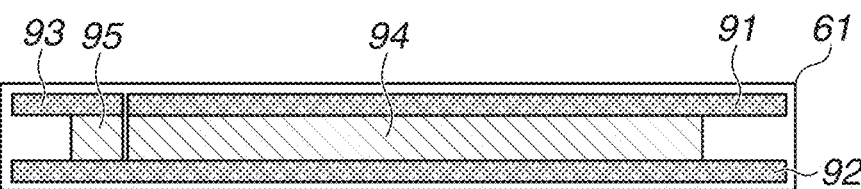
Figure 7D:
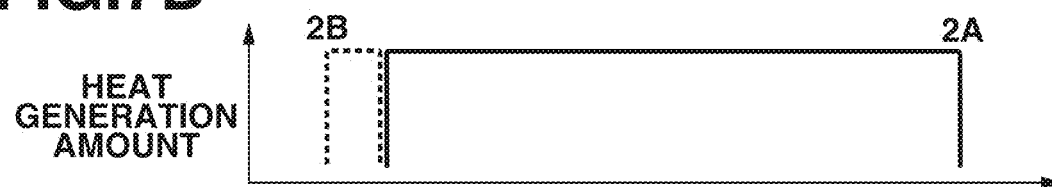
Figure 7E:
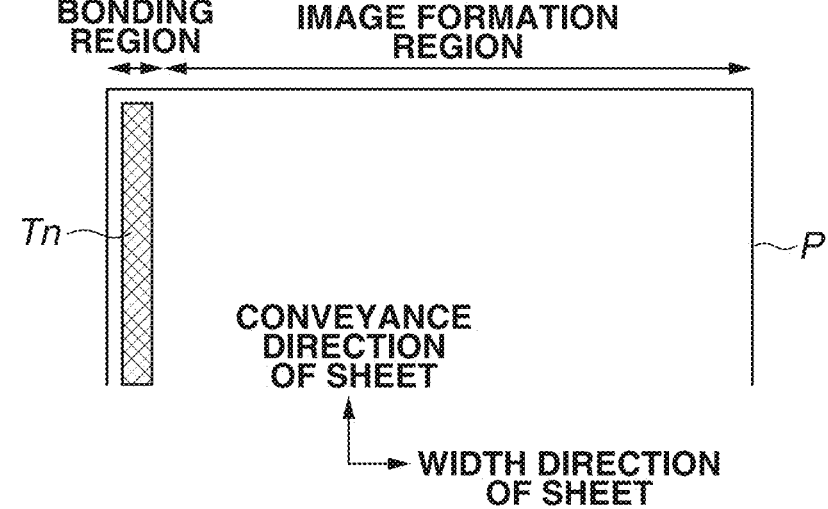

Furthermore, as a resistance heating element pattern for improving power saving performance, a pattern of dividing a resistance heating element in the sheet width direction, and supplying power in the sheet conveyance direction, as illustrated in FIG. 7C, may be employed. With power supplied between power supply electrodes 91 and 92, a resistance heating element 94 generates heat, and a result heat generation distribution in which heat is mainly generated only in an image formation region in FIG. 7E as indicated by a line 2A in FIG. 7D is obtained. On the other hand, with power supplied between a power supply electrode 93 and the power supply electrode 92, a resistance heating element 95 generates heat, and a result heat generation distribution in which heat is mainly generated only in a bonding region in FIG. 7E as indicated by a line 2B in FIG. 7D is obtained. For the sake of simplicity, in FIG. 7C, the resistance heating element is divided vertically to the sheet width direction. Alternatively, to suppress heat generation unevenness in a divided portion, the resistance heating element may be divided diagonally. In the case of the heater as illustrated in FIG. 7C, in the first mode, power is supplied to both of between the power supply electrodes 91 and 92, and between the power supply electrodes 93 and 92, and control is performed in such a manner that an almost-uniform heat generation distribution is obtained along the sheet width direction. With this configuration, heat is uniformly generated in a bonding region and an image formation region, and unfixed toner in the bonding region and unfixed toner in the image formation region are excellently fixed onto a sheet.

On the other hand, in the second mode, an amount of power supplied between the power supply electrodes 91 and 92 is set to be smaller than that in the first mode, so that control is performed in such a manner that a heat generation distribution with a small fixing temperature is obtained. In this control, the fixing temperature of a temperature detection element provided at a position corresponding to a bonding region is set to be the same temperature as that in the first mode, which reduces a heat generation amount in the image formation region where no unfixed toner exists, while excellently fixing unfixed toner in the bonding region onto a sheet. In other words, a fixing temperature in the second mode is set to be lower than that in the first mode, which reduces a heat generation amount of the fixing device 6 and improves power saving performance. In the case of the heater as illustrated in FIG. 7C, a heat generation amount in a region other than the bonding region is greatly reduced, which leads to significant improvement in power saving performance. Reducing a heat generation amount in an image region of the fixing device 6 improves, in addition to power saving performance, the quality of a booklet (suppression of a color change of a printed image, suppression of curl), improves the operating life of the fixing device 6, suppresses a temperature rise in the apparatus, and enhances a UFP discharge amount reduction effects. In the present exemplary embodiment, a fixing device employing a ceramic heater method has been described. Aside from this, even in the case of a fixing device employing an induction heater (IH), or a halogen heater method of heating a fixing member by radiation heat, as long as a heat generation distribution in the sheet width direction is able to be varied, a similar effect is obtainable. Also in each heat generation method, setting "a ratio of a heat generation amount in an image formation region to a heat generation amount in a bonding region" in the second mode to a ratio less than that in the first mode improves power saving performance.

As described in the first exemplary embodiment, after passage of the sheet P through the fixing device 6, the toner in the bonding region is subjected to the heating and pressing processing in the booklet creation operation executed by the booklet creation apparatus 300, whereby the toner in the bonding region serves as a bonding portion of a booklet. In other words, a toner image in the bonding region is not to be directly touched by the user nor viewed by the user. For this reason, even in a case where a fixing temperature in the bonding region is set to a temperature lower than a fixing temperature in the image formation region, the quality of a booklet being a final deliverable is not affected.

In view of the foregoing, in the case of employing a heater that is able to vary a heat generation distribution as in the present exemplary embodiment, also in the first mode, a fixing temperature of a temperature detection element disposed at a position corresponding to a bonding region may be set to a temperature lower than a fixing temperature of a temperature detection element disposed at a position corresponding to an image formation region. For example, a fixing temperature in the bonding region is set to 210° C. and a fixing temperature in the image formation region is set to 220° C. in the first mode, which reduces the power consumption of the fixing device 6 in the first mode more than that in the first exemplary embodiment, and improves power saving performance.

A sixth exemplary embodiment will be described. Basic configurations of the image forming apparatus 1 and the booklet creation apparatus 300 are the same as those described in the first exemplary embodiment with reference to FIG. 1. The description on the image forming apparatus 1 described in the first exemplary embodiment is to be cited, and the redundant detailed description will be omitted. In the present exemplary embodiment, a configuration of periodically executing toner purge control on a region other than a bonding region in creation of a booklet in the second mode will be described. In a case where booklet creation is performed in the second mode, a toner image that is transferred to the transfer belt 3a in a primary transfer process is for the bonding region. In other words, in a region other than the bonding region, toner is not supplied onto the transfer belt 3a, and toner (secondary transfer residual toner) remaining on the transfer belt 3a after secondary transfer does not exist. The sliding property between the transfer belt 3a and the cleaning blade (blade member) 80 that cleans toner failed to be formed on the sheet, and an adhesive agent changes in accordance with an amount of secondary transfer residual toner fed to the cleaning blade 80.

For example, toner external additive agent, such as silica, desorbed from toner functions as a sliding member between the cleaning blade 80 and the transfer belt 3a, whereby a good sliding property is maintained. Thus, for example, in a case where booklet creation in the second mode is repeated many times, in a rotation axis direction of the transfer belt 3a, secondary transfer residual toner is not fed to the cleaning blade 80 for a long period in a region of a sheet that is other than a region (bonding region) where an adhesive layer is formed. Thus, the sliding property of the cleaning blade 80 gets worse. If the sliding property of the cleaning blade 80 gets worse, a coefficient of friction between the cleaning blade 80 and the transfer belt 3*a* increases, and there is a concern that a curling cleaning failure occurs in the cleaning blade 80 or torque of a motor driving the transfer belt 3*a* increases. In view of the foregoing, in the present exemplary embodiment, in booklet creation in the second mode, toner purge control is periodically executed. The toner purge control is control of transferring toner to the transfer belt 3*a* from at least one of the process cartridges 7*n*, 7*y*, 7*m*, and 7*c* and feeding the toner to a contact portion of the transfer belt 3*a* and the cleaning blade 80, at a timing at which image formation is not performed, such as a timing corresponding an interval between sheets. In this control, toner is transferred to a region in the transfer belt 3*a* that corresponds to an image formation region.

In the present exemplary embodiment, in booklet creation in the second mode, toner purge control is executed every 50 sheets. Specifically, a predetermined amount of toner is fed from the process cartridge 7 to the cleaning blade 80 every 50 sheets at a timing corresponding an interval between sheets. When purged toner passes through the transfer nip 5*n*, a voltage of the same polarity as normal charging polarity of toner being predetermined polarity is applied to the secondary transfer roller 5, and toner is prevented from electrostatically adhering to the secondary transfer roller 5. In this process, as a region to be toner-purged, toner purge is executed in a region other than the bonding region in the sheet width direction. In the bonding region, because adhesive toner is transferred to the transfer belt 3*a* also in the second mode, sufficient secondary transfer residual toner is fed to the cleaning blade 80 corresponding to the bonding region. Thus, from the viewpoint of toner consumed amount reduction, in the present exemplary embodiment, toner purge is executed in a region other than the bonding region. In this manner, periodically supplying toner to the cleaning blade 80 corresponding to a region other than the bonding region in the second mode stabilizes a coefficient of friction between the cleaning blade 80 and the transfer belt 3*a* within an adequate range. This prevents a defect such as a cleaning failure. Furthermore, because an increase in torque of the motor driving the transfer belt 3*a* is able to be suppressed, power consumption of the motor is reduced, and consequently, power saving performance is improved. The sliding property of the cleaning blade 80 and the transfer belt 3*a* varies depending on toner characteristics, and physical property values and configurations of the transfer belt 3*a* and the cleaning blade 80. Thus, the frequency and the timing at which toner purge is executed are not limited to the above-described values, and it is desirable to set an optimum value in accordance with toner characteristics, and physical property values and configurations of the transfer belt 3*a* and the cleaning blade 80.

While, in the present exemplary embodiment, the cleaning blade 80 being in contact with the transfer belt 3*a* has been described, toner purge control may be executed on a drum cleaning blade serving as the photosensitive drum cleaning unit. For example, while a voltage with the same polarity as normal charging polarity of toner is applied to the primary transfer roller at a timing at which image formation is not performed, such as a timing corresponding to an interval between sheets, developed purge toner is fed from the powder storage unit to the drum cleaning blade. In this manner, periodically supplying toner to the drum cleaning blade lades to stabilization of a coefficient of friction between the drum cleaning blade and the photosensitive drum within an adequate range, whereby a failure such as a cleaning failure is prevented. Furthermore, because an increase in torque of a motor driving the photosensitive drum is suppressed, power consumption of the motor is reduced, and consequently, power saving performance is improved.

A seventh exemplary embodiment will be described. Basic configurations of the image forming apparatus 1 and the booklet creation apparatus 300 are the same as those described in the first exemplary embodiment with reference to FIG. 1. The description on the image forming apparatus 1 described in the first exemplary embodiment is to be cited, and the redundant detailed description will be omitted. The present exemplary embodiment is characterized in that a third mode different from the first mode and the second mode described so far is provided as a booklet creation mode. The third mode is a mode in which, in an image formation operation, toner image is formed in neither a bonding region nor an image formation region, and after that, a booklet creation operation is executed by the booklet creation apparatus 300. Specifically, the third mode is a mode in which booklet creation is performed with printed sheets on which adhesive toner has been fixed in advance in the bonding regions, and desired images have been printed in the image formation regions, being set in the sheet cassette 8 or on the multi-tray 20 of the image forming apparatus 1. As an output product, a booklet in which sheets are bonded in the bonding regions with the already-printed images remaining in the image formation regions is created. The third mode differs from the second mode in that adhesive toner has been fixed in advance in the bonding regions of sheets set in the sheet cassette 8 or on the multi-tray 20. An example of the use case of the third mode, is a case where desired images have been printed in image regions on sheets and adhesive toner have been printed in the bonding regions by using an SFP having only a print function, and after that, the sheets are bound as a booklet by an image forming apparatus including a booklet creation apparatus that can perform booklet creation. Especially in a case where adhesiveness is satisfied even with printing toner that is used as adhesive toner, without preparing a special process cartridge storing the adhesive toner Tn, forming a toner image for bonding in the bonding region is easy performed even with the SFP. In the present exemplary embodiment, a sheet on which adhesive toner has been fixed in advance in the bonding region, and the image formation region is blank, may also be included.

Figure 8:
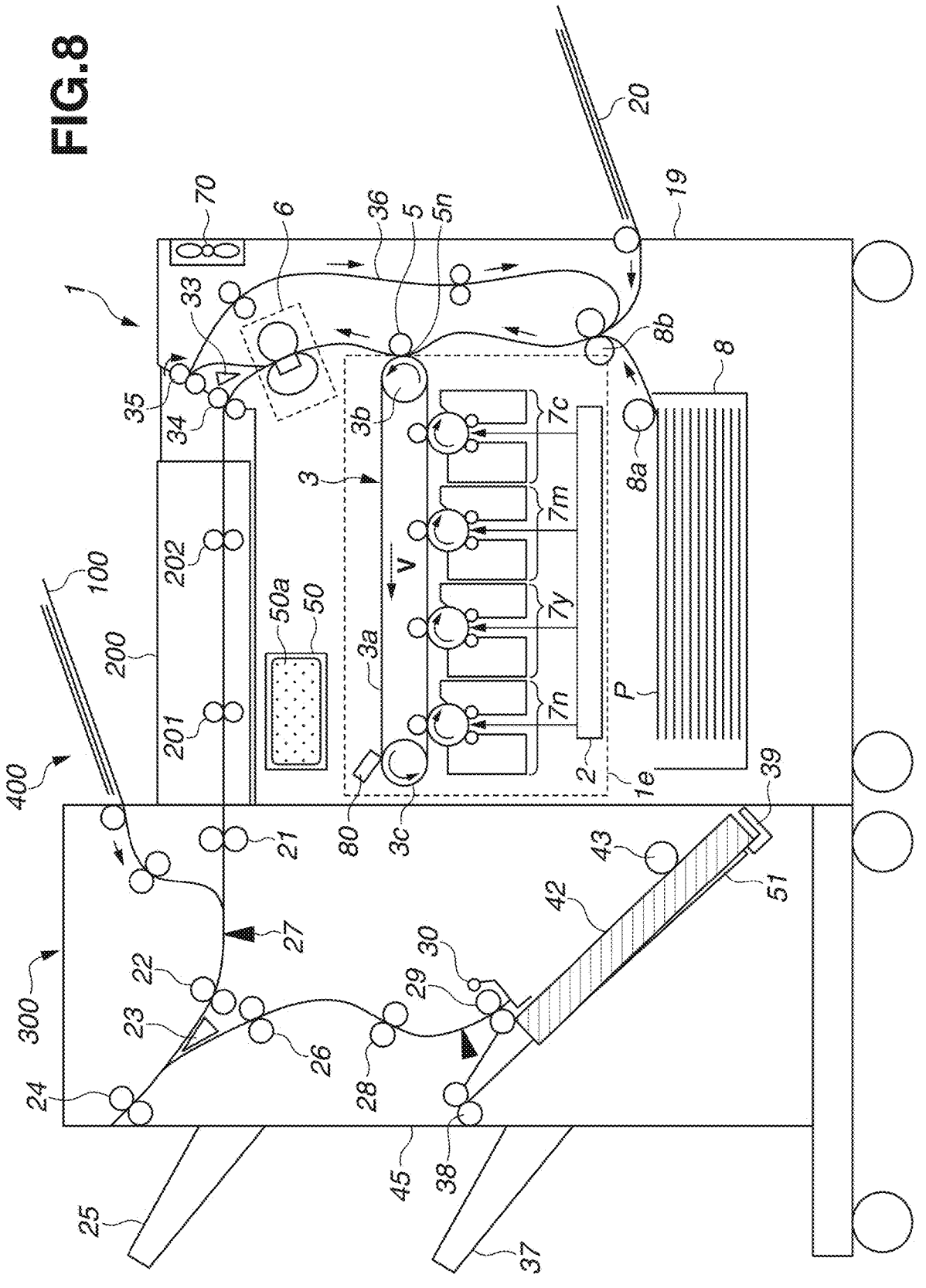
FIG. 8 is a cross-sectional view illustrating a configuration of a modified example of a seventh exemplary embodiment.

The present exemplary embodiment is characterized in that the setting of the fixing device 6 of the image forming apparatus 1 in the third mode is changed from that in the first mode or the second mode. Specifically, the present exemplary embodiment is characterized in that at least one of a fixing temperature of the fixing device 6, the output of a fixing bias, and the pressing force of the fixing device 6 in the third mode during booklet creation is set to be lower than a value in the second mode. In the third mode, on a sheet passing through the fixing device 6, unfixed toner exists in neither the image formation region nor the bonding region. Thus, setting a fixing temperature, the output of a fixing bias, or pressing force to as low value as possible improves power saving performance. In the present exemplary embodiment, in the third mode, a fixing temperature is set to 150° C., the output of a fixing bias is set to 0 V, and pressing force is set to 10 kgf, which are values lower than values of a fixing temperature, a fixing bias, and pressing force in the second mode. Here, if a fixing temperature is set excessively low, the viscosity of sliding grease on the inner surface of the fixing film 62 increases, and there is a concern that sliding resistance increases and a sheet conveyance performance gets worse. If pressing force is set excessively low, pinching and conveying of sheets may be failed due to a failure in maintaining a sufficient fixing nip, and there is a concern that sheet conveyance performance is deteriorated. In view of the foregoing, in the present exemplary embodiment, a fixing temperature and pressing force are set as low as low possible to the extent that sheet conveyance performance is maintained, and the above-described values are set. In this manner, in the present exemplary embodiment, the third mode is additionally provided as a booklet creation mode, and the setting of the fixing device 6 in the third mode is changed from that in the first mode and the second mode, power saving performance is improved. Regarding the toner purge control described in the sixth exemplary embodiment, in the third mode, it is desirable to execute toner purge over the entire region in the sheet width direction. In the present exemplary embodiment, the configuration of performing booklet creation with sheets in the third mode being set in the sheet cassette 8 or on the multi-tray 20 of the image forming apparatus 1 has been described, but a sheet feeding position is not limited to this. For example, as illustrated in FIG. 8, a sheet feeding unit 100 may be additionally disposed in the booklet creation apparatus 300, and sheets are directly fed from the sheet feeding unit 100 to the thermal compression unit 51, booklet creation in the third mode may be executed not via the image forming apparatus 1. In this case, because booklet creation is completed only by the booklet creation apparatus 300, and the image forming apparatus 1 is not to be operated, which further improves power saving performance.

In a case where power supply to the image forming apparatus 1 and the booklet creation apparatus 300 is performed using one power source cable and one outlet, a ratio between a power supply amount to the fixing device 6 of the image forming apparatus 1 and a power supply amount to the thermal compression unit 51 of the booklet creation apparatus 300 may be changed among the first, second, and the third modes. Specifically, "a ratio of a power supply amount to the thermal compression unit 51 to a power supply amount to the fixing device 6" may be set in such a manner as to satisfy the relationship of "first mode<second mode<third mode". In particular, in order to shorten a start-up time in an initial operation during booklet creation, the fixing device 6 and the thermal compression unit 51 are heated simultaneously, and thus it is desirable to appropriately distribute power supplied from one power source cable to the fixing device 6 and the thermal compression unit 51.

The fixing temperature of the fixing device 6 satisfies the relationship of "first mode>second mode>third mode", and a power amount to be used for the start-up of the fixing device 6 in the initial operation satisfies the relationship of "first mode>second mode>third mode". Thus, in a booklet creation mode in which a fixing temperature is low and power to be used for the start-up of the fixing device 6 is small, it is desirable to shorten a start-up time of the thermal compression unit 51 by increasing a power supply amount to the thermal compression unit 51. In view of the foregoing, "a ratio of a power supply amount to the thermal compression unit 51 to a power supply amount to the fixing device 6" is set in such a manner that the relationship of "first mode<second mode<third mode" is satisfied. Furthermore, the start-up time of the thermal compression unit 51 is set in such a manner as that the relationship of "first mode>second mode>third mode" is satisfied, and it is desirable to shorten a start-up time in an initial operation during booklet creation, while improving power saving performance as described above.

Figure 9:
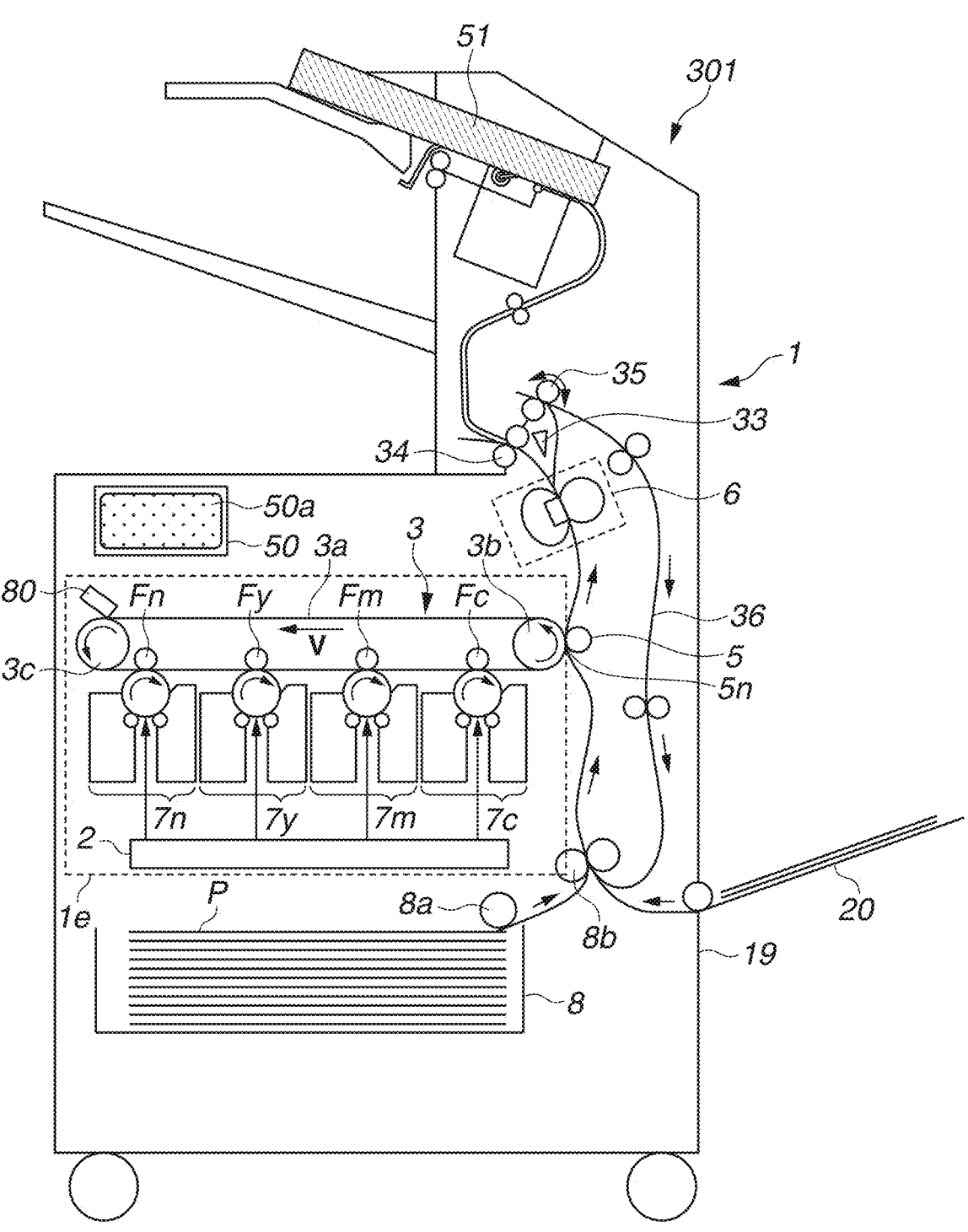
FIG. 9 is a cross-sectional view illustrating a configuration of a modified example of exemplary embodiments.

While, in the embodiments, a configuration in which the booklet creation apparatus 300 including the thermal compression unit 51 is arranged next to the image forming apparatus 1 has been described, the configuration of the present disclosure is not so limited. For example, as illustrated in FIG. 9, a configuration in which an upper-part-installation-type booklet creation apparatus 301 and the thermal compression unit 51 are disposed in an upper part of an image forming apparatus main body may be employed.

The above-described exemplary embodiments disclose at least the following image forming system.

(Item 1)

An image forming system comprising:

an image forming apparatus including:

an image forming unit configured to form at least one of a toner image and an adhesive layer on a sheet, and a fixing unit configured to fix the toner image and the adhesive layer to the sheet at a predetermined temperature by heating and pressing while pinching and conveying the sheet; and a booklet creation apparatus configured to create, in a state in which a plurality of sheets to which adhesive layers are fixed are overlaid, a booklet, wherein the booklet is created by heating and pressing the adhesive layers fixed to the plurality of sheets to bond the plurality of sheets, wherein:

in a first mode in which the image forming unit forms toner images and adhesive layers on sheets, the booklet creation apparatus creates a booklet using the sheets; and in a second mode in which the image forming unit only forms adhesive layers on sheets, the booklet creation apparatus creates a booklet using the sheets, and wherein the predetermined temperature is lower in the second mode than in the first mode.

(Item 2)

The image forming system according to item 1, wherein, in a case where a number of pages of a booklet created consecutively in the second mode exceeds a predetermined number of sheets, for each subsequent sheet exceeding the predetermined number of sheets, at least one of the predetermined temperature or a conveyance interval of sheets in the second mode is greater than the at least one of the predetermined temperature and the conveyance interval set before the predetermined number of sheets was exceeded in the second mode.

(Item 3)

The image forming system according to item 2, wherein the at least one of the predetermined temperature or the conveyance interval return to an original value in a case where one of (a) a booklet is created with a number of sheets that is different from the predetermined number of sheets, or (b) the heating and pressing are performed on a sheet bundle including a final page of the booklet.

(Item 4)

The image forming system according to any one of items 1 to 3, wherein, in a third mode sheets are used on which adhesive layers have been formed in advance, wherein, in the third mode, the booklet creation apparatus creates a booklet without the image forming unit forming either a toner image or an adhesive layer on a sheet, and wherein the predetermined temperature is lower in the third mode than in the second mode.

(Item 5)

An image forming system comprising:

an image forming apparatus including:

an image forming unit configured to form at least one of a toner image and an adhesive layer on a sheet;

a fixing unit configured to fix the toner image and the adhesive layer to the sheet at a predetermined temperature by heating and pressing while pinching and conveying the sheet, the fixing unit including a rotary member configured to pinch and convey the sheet; and a power source configured to apply a voltage with a predetermined polarity to the rotary member in the heating and pressing of the sheet in the fixing unit; and a booklet creation apparatus configured to create, in a state in which a plurality of sheets to which adhesive layers are fixed are overlaid, a booklet, wherein the booklet is created by heating and pressing the adhesive layers fixed to the plurality of sheets, to bond the plurality of sheets, wherein, in a first mode in which the image forming unit forms toner images and adhesive layers on sheets, the booklet creation apparatus creates a booklet using the sheets; and in a second mode in which the image forming unit only forms adhesive layers on sheets, the booklet creation apparatus creates a booklet using the sheets, and wherein a value of the voltage to be applied from the power source to the fixing unit is lower in the second mode than in the first mode.

(Item 6)

The image forming system according to item 5, wherein, in a case where a number of pages of a booklet created consecutively in the second mode exceeds a predetermined number of sheets, for each subsequent sheet exceeding the predetermined number of sheets, at least one of the voltage set for heating and pressing or a conveyance interval of sheets in the second mode is greater than the at least one of the predetermined temperature and the conveyance interval set before the predetermined number of sheets was exceeded in the second mode.

(Item 7)

The image forming system according to item 6, wherein the at least one of the predetermined number of sheets or the conveyance interval return to an original value in a case where one of: (a) a booklet is created with a number of sheets exceeding the predetermined number of sheets, or (b) the heating and pressing are performed on a sheet bundle including a final page of the booklet.

(Item 8)

The image forming system according to any one of items 5 to 7, wherein, in a third mode sheets are used on which adhesive layers have been formed in advance, wherein, in the third mode, the booklet creation apparatus creates a booklet without the image forming unit forming either a toner image or an adhesive layer on a sheet, and wherein the value of the voltage set for heating and pressing is lower in the third mode than in the second mode.

(Item 9)

An image forming system comprising:

an image forming apparatus including an image forming unit configured to form at least one of a toner image and an adhesive layer on a sheet, and a fixing unit configured to fix the toner image and the adhesive layer to the sheet at a predetermined temperature by heating and pressing while pinching and conveying the sheet; and a booklet creation apparatus configured to create, in a state in which a plurality of sheets to which adhesive layers are fixed are overlaid, a booklet, wherein the booklet is created by heating and pressing the adhesive layers fixed to the plurality of sheets, to bond the plurality of sheets, wherein:

in a first mode in which the image forming unit forms toner images and adhesive layers on sheets, the booklet creation apparatus creates a booklet using the sheets; and in a second mode in which the image forming unit only forms adhesive layers on sheets, the booklet creation apparatus creates a booklet using the sheets, and wherein a pressure to be applied to a sheet by the fixing unit is lower in the second mode than in the first mode.

(Item 10)

The image forming system according to item 9, wherein, in a case where a number of pages of a booklet created consecutively in the second mode exceeds a predetermined number of sheets, for each subsequent sheet at least one of the pressure to be applied to the sheet and a conveyance interval of sheets in the second mode is greater than the at least one of the predetermined temperature and the conveyance interval set before the predetermined number of sheets was exceeded in the second mode.

(Item 11)

The image forming system according to item 10, wherein at least one of the pressure or the conveyance interval return to an original value in a case where one of: (a) a booklet is created with a number of sheets exceeding the predetermined number of sheets, or (b) the heating and pressing are performed on a sheet bundle including a final page of the booklet.

(Item 12)

The image forming system according to any one of items 9 to 11, wherein, in a third mode, sheets are used on which adhesive layers have been formed in advance, wherein, in the third mode, the booklet creation apparatus creates a booklet without the image forming unit forming either a toner image or an adhesive layer on a sheet, and wherein the set pressure is lower in the third mode than in the second mode.

(Item 13)

The image forming system according to any one of items 1 to 12, wherein the fixing unit is configured to change the predetermined temperature in a width direction intersecting with a sheet conveyance direction with respect to a sheet surface, and wherein a magnitude of the predetermined temperature, for heating a toner image region relative to the predetermined temperature for heating an adhesive layer region, set for heating and pressing a sheet in the fixing unit is lower in the second mode than in the first mode.

(Item 14)

An image forming system comprising:

an image forming apparatus including:

an image forming unit configured to form at least one of a toner image and an adhesive layer on a sheet, the image forming unit including an image bearing member that is rotatable and bears at least one of toner and an adhesive agent;

a fixing unit configured to fix the toner image and the adhesive layer to the sheet at a predetermined temperature by heating and pressing while pinching and conveying the sheet; and a blade member configured to be in contact with the image bearing member to clean the image bearing member; and a booklet creation apparatus configured to create, in a state in which a plurality of sheets to which adhesive layers are fixed are overlaid, a booklet, wherein the booklet is created by heating and pressing the adhesive layers fixed to the plurality of sheets, to bond the plurality of sheets, wherein:

in a first mode in which the image forming unit forms toner images and adhesive layers on sheets, the booklet creation apparatus creates a booklet using the sheets; and in a second mode in which the image forming unit only forms adhesive layers on sheets, the booklet creation apparatus creates a booklet using the sheets, and wherein, in the second mode, in a rotation axis direction of the image bearing member, toner is supplied to a contact portion between the image bearing member and the blade member corresponding to a sheet region other than a region of a sheet where the adhesive layer is formed.

According to an exemplary embodiment, an image forming system with power saving performance improved by reducing power consumption in the image forming system is provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-183847, filed Oct. 26, 2023, which is hereby incorporated by reference herein in its entirety.

What is claimed is:

1. An image forming system, comprising:

an image forming apparatus including:

an image forming unit configured to form at least one of a toner image and an adhesive layer on a sheet, and a fixing unit configured to fix the toner image and the adhesive layer to the sheet at a predetermined temperature by heating and pressing while pinching and conveying the sheet; and a booklet creation apparatus configured to create, in a state in which a plurality of sheets to which adhesive layers are fixed are overlaid, a booklet, wherein the booklet is created by heating and pressing the adhesive layers fixed to the plurality of sheets, to bond the plurality of sheets, wherein: in a first mode in which the image forming unit forms toner images and adhesive layers on sheets, the booklet creation apparatus creates a booklet using the sheets; and in a second mode in which the image forming unit only forms adhesive layers on sheets, the booklet creation apparatus creates a booklet using the sheets, and wherein the predetermined temperature is lower in the second mode than in the first mode, and in a case where a number of pages of a booklet created consecutively in the second mode exceeds a predetermined number of sheets, for each subsequent sheet exceeding the predetermined number of sheets, at least one of the predetermined temperature or a conveyance interval of sheets in the second mode is greater than the at least one of the predetermined temperature or the conveyance interval set before the predetermined number of sheets was exceeded in the second mode.

2. The image forming system according to claim 1, wherein the at least one of the predetermined temperature or the conveyance interval return to an original value in a case where one of: (a) a booklet is created with a number of sheets that is different from the predetermined number of sheets, or (b) the heating and pressing are performed on a sheet bundle including a final page of the booklet.

3. The image forming system according to claim 1, wherein, in a third mode sheets are used on which adhesive layers have been formed in advance, wherein, in the third mode, the booklet creation apparatus creates a booklet without the image forming unit forming either a toner image or an adhesive layer on a sheet, and wherein the predetermined temperature is lower in the third mode than in the second mode.

4. An image forming system, comprising:

an image forming apparatus including:

an image forming unit configured to form at least one of a toner image and an adhesive layer on a sheet;

a fixing unit configured to fix the toner image and the adhesive layer to the sheet at a predetermined temperature by heating and pressing while pinching and conveying the sheet, the fixing unit including a rotary member configured to pinch and convey the sheet; and a power source configured to apply a voltage with a predetermined polarity to the rotary member in the heating and pressing of the sheet in the fixing unit; and a booklet creation apparatus configured to create, in a state in which a plurality of sheets to which adhesive layers are fixed are overlaid, a booklet, wherein the booklet is created by heating and pressing the adhesive layers fixed to the plurality of sheets, to bond the plurality of sheets, wherein, in a first mode in which the image forming unit forms toner images and adhesive layers on sheets, the booklet creation apparatus creates a booklet using the sheets; and in a second mode in which the image forming unit only forms adhesive layers on sheets, the booklet creation apparatus creates a booklet using the sheets, and wherein a value of the voltage to be applied from the power source to the fixing unit is lower in the second mode than in the first mode, and

in a case where a number of pages of a booklet created consecutively in the second mode exceeds a predetermined number of sheets, for each subsequent sheet exceeding the predetermined number of sheets, at least one of the voltage set for heating and pressing or a conveyance interval of sheets in the second mode is greater than the at least one of the voltage and the conveyance interval set before the predetermined number of sheets was exceeded in the second mode.

5. The image forming system according to claim 4, wherein the at least one of the voltage or the conveyance interval return to an original value in a case where one of: (a) a booklet is created with a number of sheets exceeding the predetermined number of sheets, or (b) the heating and pressing are performed on a sheet bundle including a final page of the booklet.

6. The image forming system according to claim 4, wherein, in a third mode sheets are used on which adhesive layers have been formed in advance, wherein, in the third mode, the booklet creation apparatus creates a booklet without the image forming unit forming either a toner image or an adhesive layer on a sheet, and wherein the value of the voltage set for heating and pressing is lower in the third mode than in the second mode.

7. An image forming system, comprising:

an image forming apparatus including:

an image forming unit configured to form at least one of a toner image and an adhesive layer on a sheet, and a fixing unit configured to fix the toner image and the adhesive layer to the sheet at a predetermined temperature by heating and pressing while pinching and conveying the sheet; and a booklet creation apparatus configured to create, in a state in which a plurality of sheets to which adhesive layers are fixed are overlaid, a booklet, wherein the booklet is created by heating and pressing the adhesive layers fixed to the plurality of sheets, to bond the plurality of sheets,

34 wherein:

in a first mode in which the image forming unit forms toner images and adhesive layers on sheets, the booklet creation apparatus creates a booklet using the sheets; and in a second mode in which the image forming unit only forms adhesive layers on sheets, the booklet creation apparatus creates a booklet using the sheets, and wherein a pressure to be applied to a sheet by the fixing unit is lower in the second mode than in the first mode, and in a case where a number of pages of a booklet created consecutively in the second mode exceeds a predetermined number of sheets, for each subsequent sheet at least one of the pressure to be applied to the sheet and a conveyance interval of sheets in the second mode is greater than the at least one of the pressure and the conveyance interval set before the predetermined number of sheets was exceeded in the second mode.

8. The image forming system according to claim 7, wherein at least one of the pressure or the conveyance interval return to an original value in a case where one of: (a) a booklet is created with a number of sheets exceeding the predetermined number of sheets, or (b) the heating and pressing are performed on a sheet bundle including a final page of the booklet.

9. The image forming system according to claim 7, wherein, in a third mode sheets are used on which adhesive layers have been formed in advance, wherein, in the third mode, the booklet creation apparatus creates a booklet without the image forming unit forming either a toner image or an adhesive layer on a sheet, and wherein the set pressure is lower in the third mode than in the second mode.

10. The image forming system according to claim 1, wherein the fixing unit is configured to change the predetermined temperature in a width direction intersecting with a sheet conveyance direction with respect to a sheet surface, and wherein a magnitude of the predetermined temperature for heating a toner image region relative to the predetermined temperature for heating an adhesive layer region set for heating and pressing a sheet in the fixing unit is lower in the second mode than in the first mode.

* * * * *